US005764809A

United States Patent [19]
Nomami et al.

[11] Patent Number: 5,764,809
[45] Date of Patent: Jun. 9, 1998

[54] IMAGE PROCESSING APPARATUS USING CORRELATION AMONG IMAGES

[75] Inventors: Tetsuo Nomami, Tama; Nagaaki Ohyama, Kawasaki; Masahiro Yamaguchi, Tokyo; Hirokazu Nishimura; Masakazu Nakamura, both of Hachioji, all of Japan

[73] Assignee: Olympus Optical Co., Ltd., Tokyo, Japan

[21] Appl. No.: 721,397

[22] Filed: Sep. 26, 1996

Related U.S. Application Data

[63] Continuation of Ser. No. 291,733, Aug. 16, 1994, abandoned, which is a continuation of Ser. No. 856,991, Mar. 24, 1992, abandoned.

[30] Foreign Application Priority Data

Mar. 26, 1991 [JP] Japan ................... 3-062114
Feb. 19, 1992 [JP] Japan ................... 4-032311

[51] Int. Cl.$^6$ ............................................. G06K 9/00
[52] U.S. Cl. ................. 382/284; 382/128; 382/209; 348/48
[58] Field of Search ..................... 382/128, 151, 382/209, 218, 293, 300, 284; 348/71, 45, 77, 241, 246, 607, 615, 616; 395/135

[56] References Cited

U.S. PATENT DOCUMENTS

| | | | |
|---|---|---|---|
| 4,329,708 | 5/1982 | Yamamoto et al. | 348/616 |
| 4,633,303 | 12/1986 | Nagasaki et al. | 348/65 |
| 4,819,077 | 4/1989 | Kikuchi et al. | 348/71 |
| 4,895,431 | 1/1990 | Tsujiuchi et al. | 350/320 |
| 4,962,540 | 10/1990 | Tsujiuchi et al. | 382/17 |
| 4,985,930 | 1/1991 | Takeda et al. | 382/57 |
| 5,187,754 | 2/1993 | Currin et al. | 382/54 |
| 5,296,930 | 3/1994 | Thomson | 348/607 |

*Primary Examiner*—Jose L. Couso
*Assistant Examiner*—Matthew C. Bella
*Attorney, Agent, or Firm*—Armstrong, Westerman, Hattori, McLeland & Naughton

[57] ABSTRACT

An image processing apparatus comprises a CPU, an information input unit, a main storage made up of a RAM, an image input interface, a display interface, and a ROM. These components are mutually connected on a bus. The CPU includes an image processor which operates according to programs stored in the ROM. The image processor comprises a corresponding point detector for detecting corresponding points in multiple images, an image matching unit for matching at least two images according to the output result of the corresponding point detector, and an image synthesizer for synthesizing at least part of at least one image portion matched by said image matching unit with at least part of image information of other images to form a single image. The information input unit is a keyboard for entering the type of an electronic endoscope and other data. The image input interface is connected to image memories and receives image data from the memories.

34 Claims, 26 Drawing Sheets

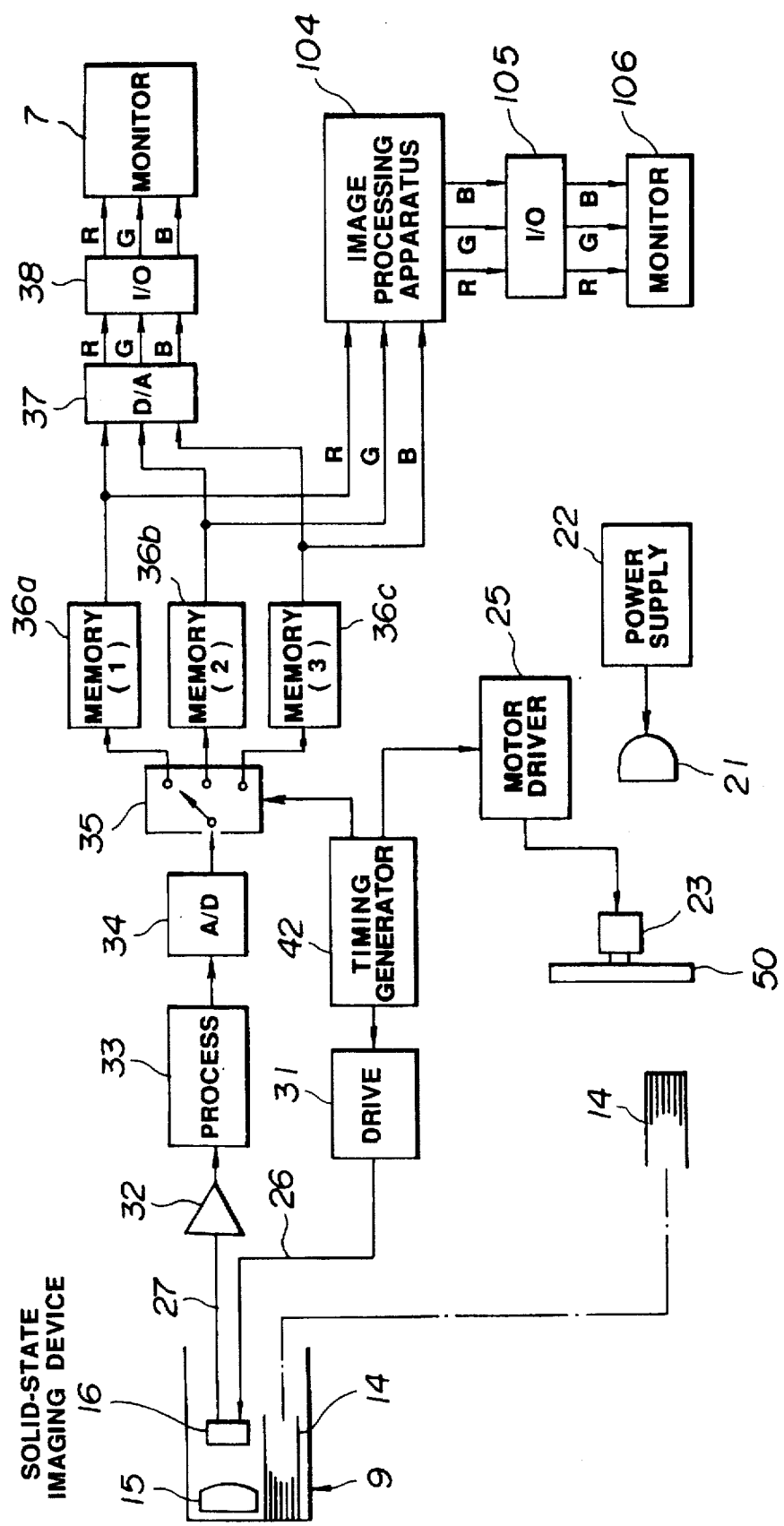

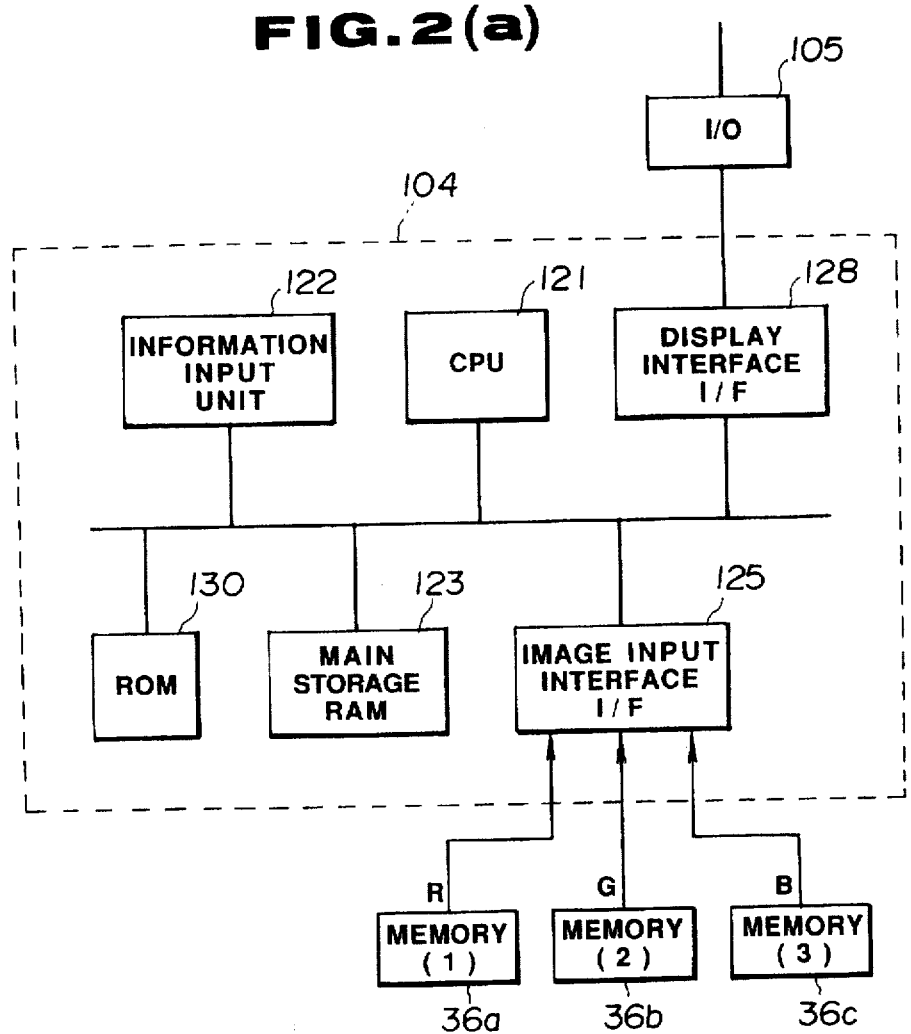
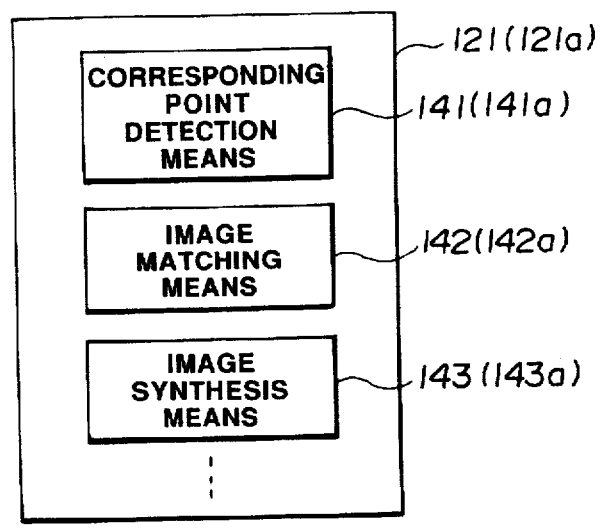

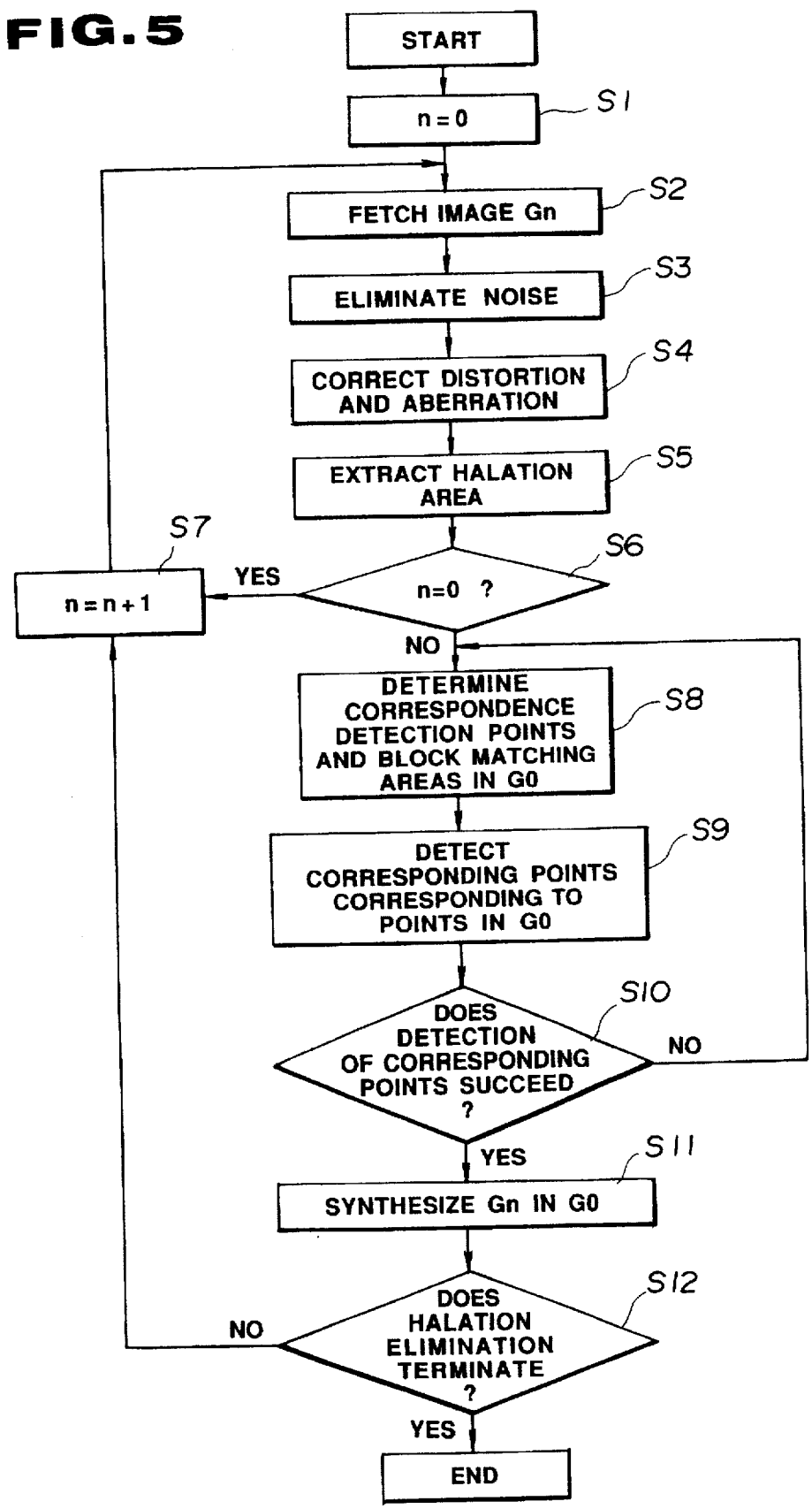

A TO D: CORRESPONDENCE DETECTION POINT

A' TO D' : CORRESPONDING POINT
n = 1, 2, 3 ---

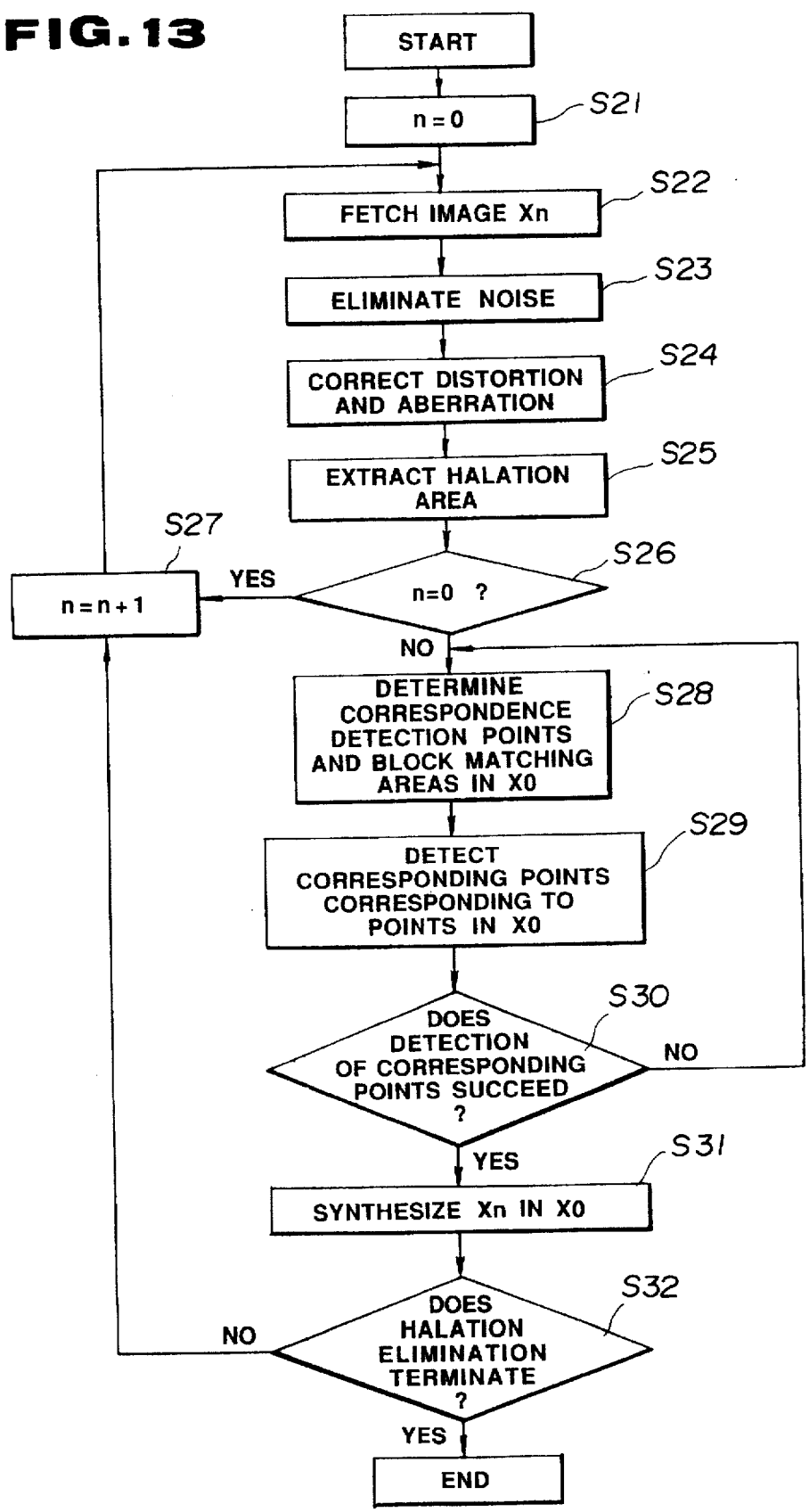

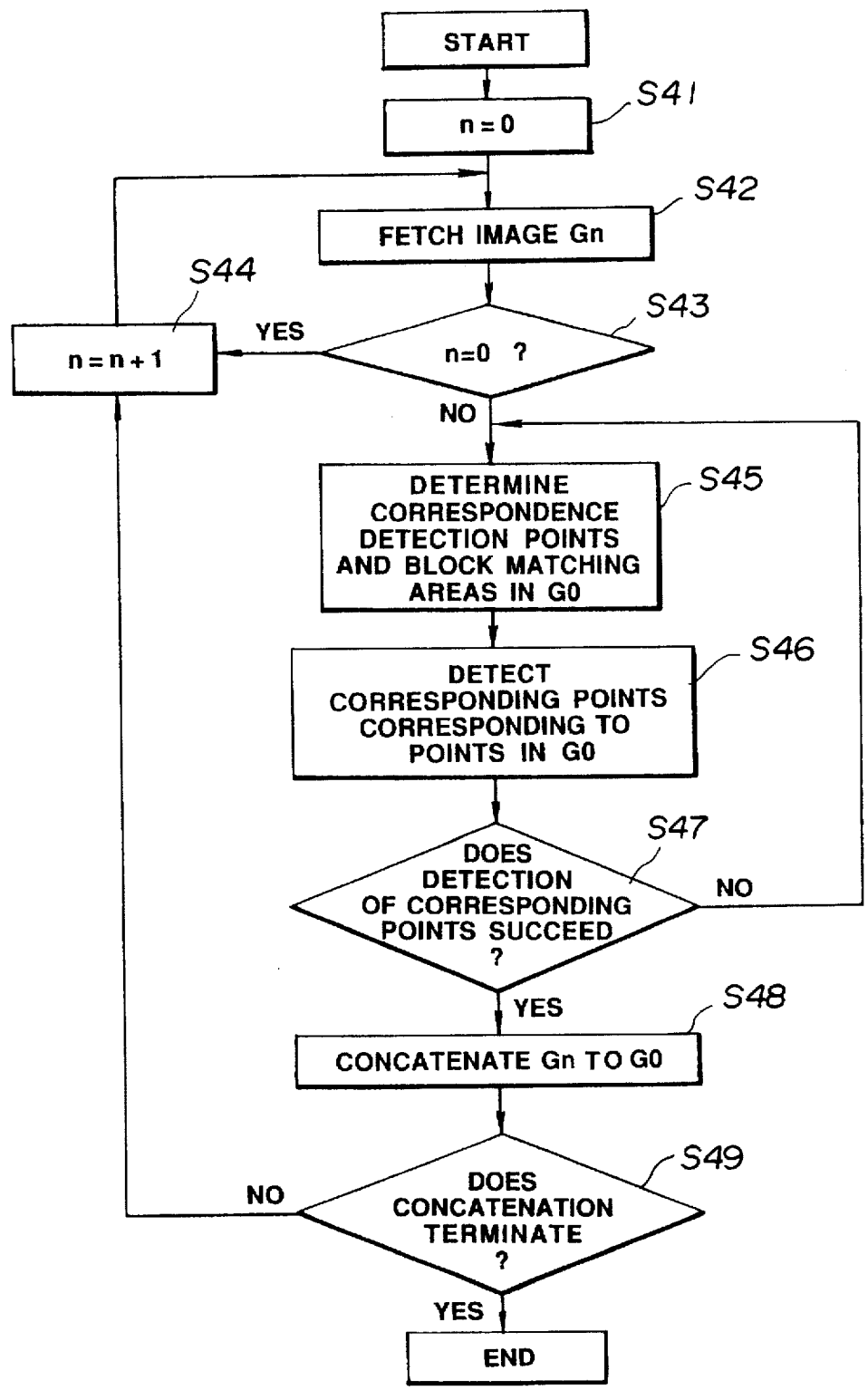

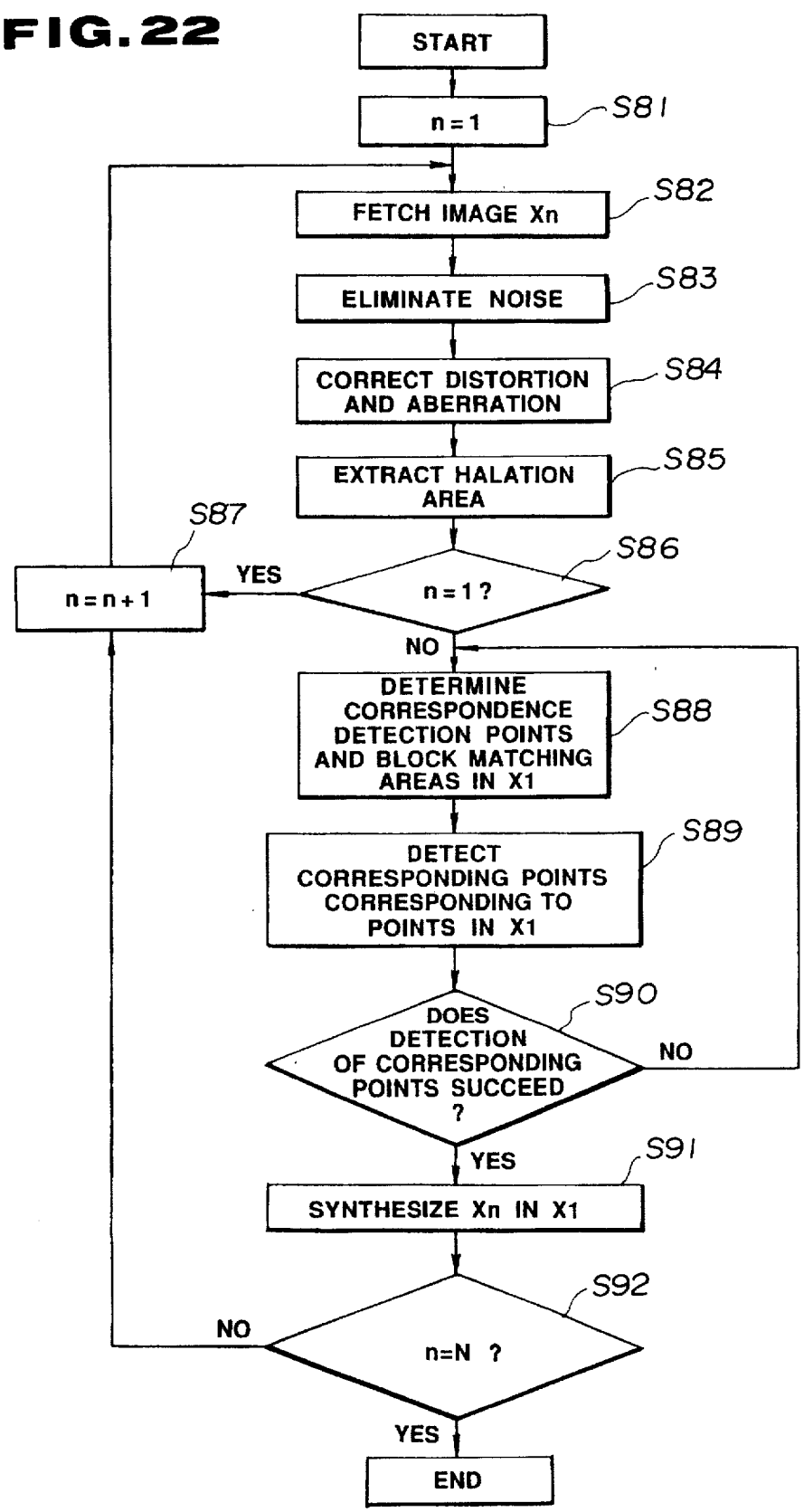

FIG. 23(a)
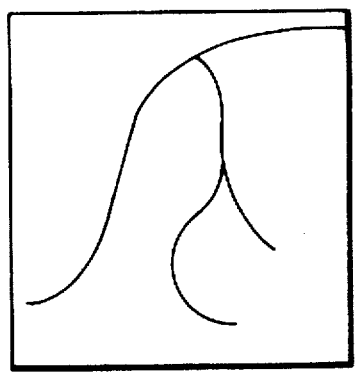
IMAGE XL
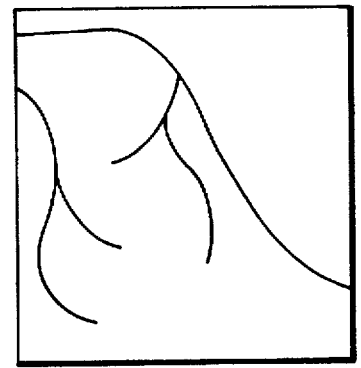
IMAGE XR
FIG. 23(b)
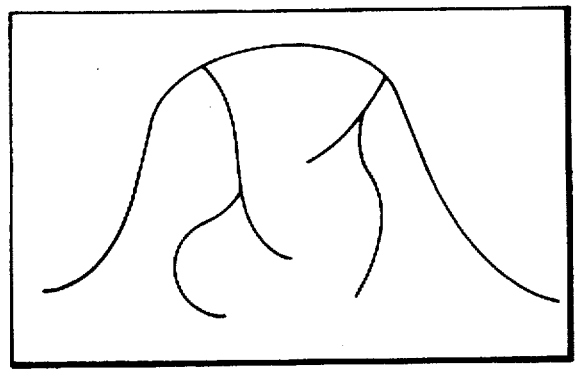

NOMAL IMAGE X0

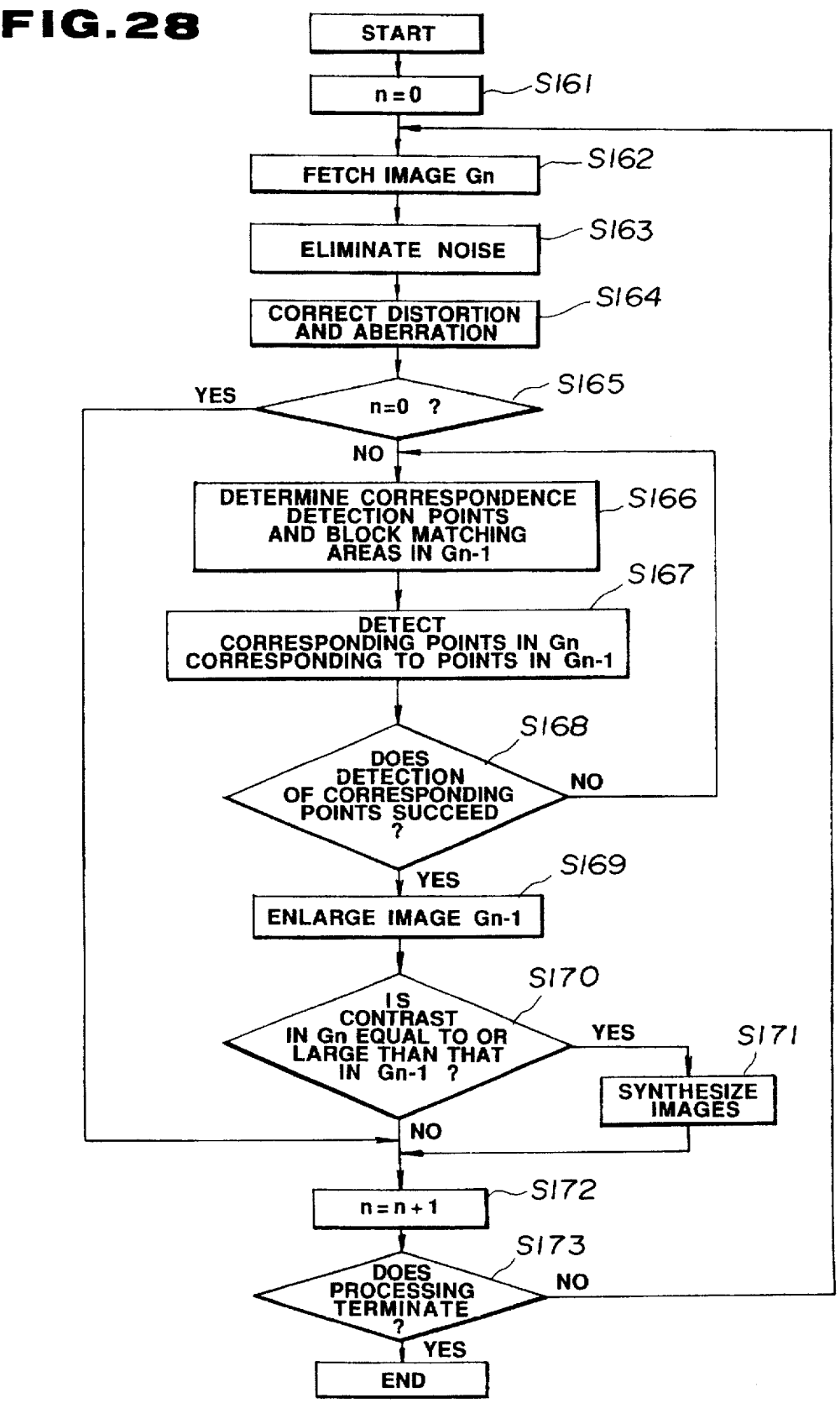

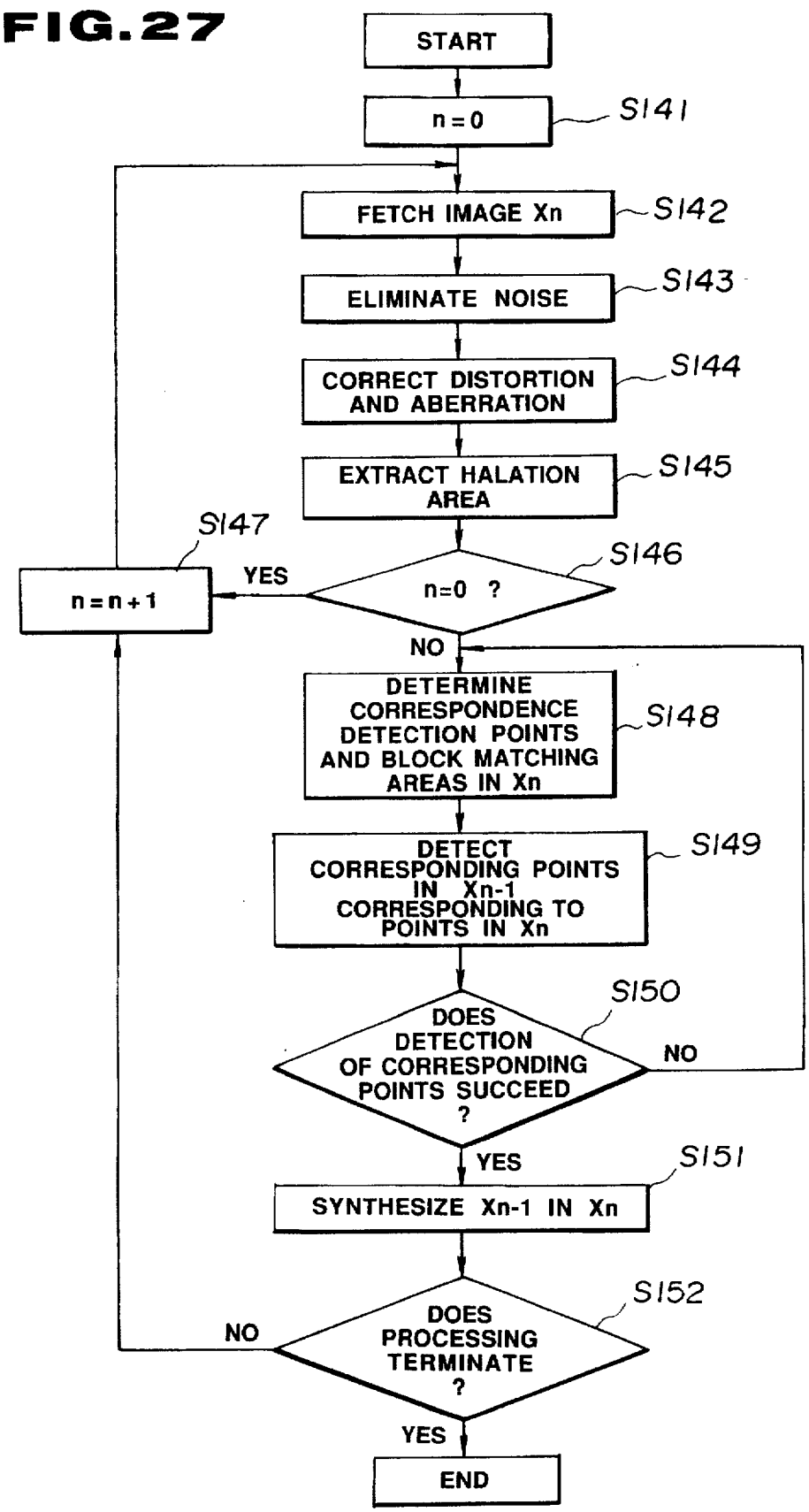

FIG. 32(a)
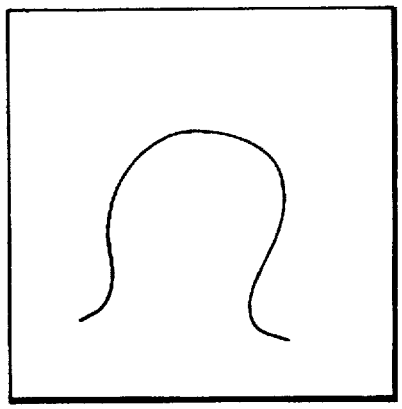
IMAGE Gn-1
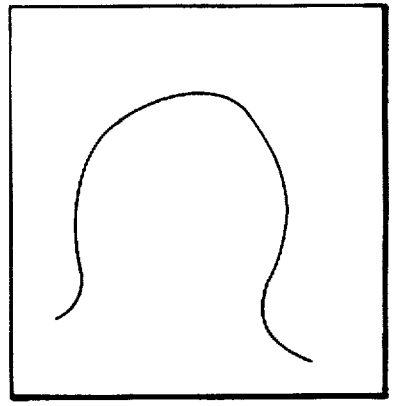
IMAGE Gn
FIG. 32(b)
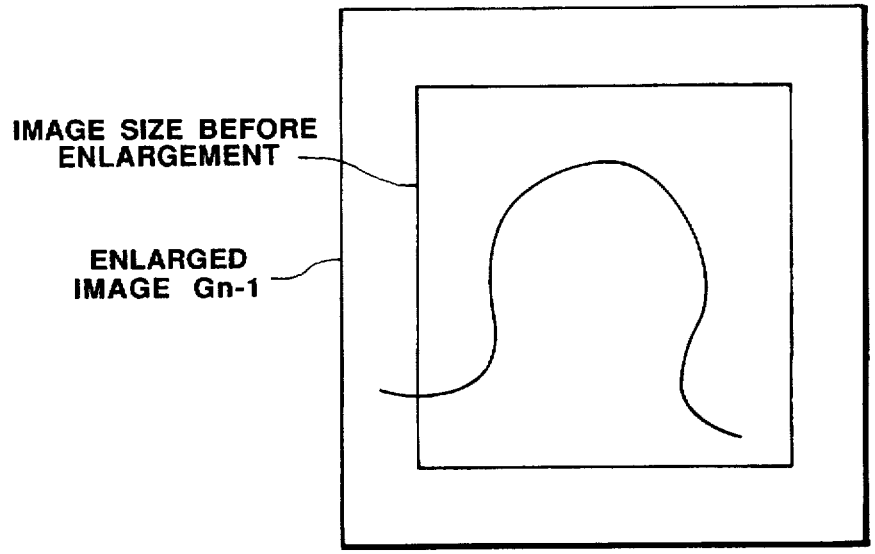
IMAGE SIZE BEFORE ENLARGEMENT
ENLARGED IMAGE Gn-1

IMAGE Gn-1

IMAGE Gn

IMAGE PROCESSING APPARATUS USING CORRELATION AMONG IMAGES

This application is a continuation of application Ser. No. 08/291,733, filed Aug. 16, 1994, now abandoned, which is a continuation of application Ser. No. 07/856,991, filed Mar. 24, 1992, now abandoned.

BACKGROUND OF THE INVENTION

1. Field of the Invention

The present invention relates to an image processing apparatus for forming new images with faults of raw images eliminated by processing multiple images of the same subject using correlation among images.

2. Description of the Related Art

With development of semiconducting devices and image processing technologies, enormous amounts of image data have come to be processed simultaneously or quickly on a practical basis.

In particular, technologies using correlation among images are evolving remarkably. One of the fields currently studied most heatedly is, for example, compressed encoding and decoding, wherein dynamic vectors are estimated in animated image frames for digital transmission. For example, Japanese Patent Laid-Open No.1-109970 has disclosed the prior art of preventing image deflection in a TV camera.

A demanding need in general imaging fields is to produce clearer images permitting wide field of views but not containing any faults. Under normal environments, a general imaging technique can provide images meeting the above requirements practically satisfactorily. In some fields, however, the requirements cannot be satisfied theoretically.

For example, in endoscopes gaining popularity recently, an elongated insertion tube can be inserted into body cavities to observe lesions inside them or treat them using treatment adapters, if necessary, without conducting resection.

The aforesaid endoscope is divided into two types: an optical type using an image guide as an image transmission means, and an electronic type using a CCD or other solid-state imaging means which has been put to practical use and provides more clear images.

However, when medical endoscopes and other medical equipment are used to observe glittering mucosal surfaces covered with mucus, diagnostic illumination light reflects regularly. The reflected light enters an imaging plane, causing a luminescent spot (halation). This may interrupt clinical observation.

A normal optical system for a medical endoscope is subjected to intense distortion and aberration because of the super wide field of view. Therefore, to observe an object in detail, the object must be aligned with the center of a small field of view causing little distortion and aberration. A single image obtained in this way does not permit simultaneous observation of a very wide region. This tendency becomes more remarkable in close imaging or enlarged endoscopy, making it difficult to visualize an object entirely.

An attempt has been made to combine polar screens in different ways and thus prevent a luminescent spot due to regular reflection from interrupting observation. This results in insufficient light or sacrifices color reproducibility. Therefore, a combination of polar screens has not been used in practice.

An attempt to widen a field of view has been disclosed as a procedure for creating panoramic images using multiple images in Japanese Patent Laid-Open No.1-251962. No consideration has been taken into a shift in a view point and a change in distance. The scope of the invention is, therefore, very limited.

SUMMARY OF THE INVENTION

One object of the present invention is to provide an image processing apparatus capable of processing multiple images acquired from the same object to eliminate abnormal data areas or provide a synthetic image having an enlarged field of view and improved resolution.

Another object of the invention is to provide an image processing apparatus capable of processing multiple time-series images acquired from the same object to eliminate abnormal data areas or provide a synthetic image having an enlarged field of view and improved resolution.

An image processing apparatus according to the present invention comprises an image input means for inputting multiple images, a corresponding point detection means for detecting corresponding points in the multiple images, an image matching means for matching at least two images according to the detection result of the corresponding point detection means, and a synthesizing means for synthesizing a single image by combining at least part of one image portion of at least two images matched by the image matching means with at least part of image information of other images.

BRIEF DESCRIPTION OF THE DRAWINGS

FIGS. 1 to 17 relate to the first embodiment of the present invention;

FIG. 1 is a block diagram showing the configuration of an endoscope apparatus;

FIGS. 2(a) and 2(b) are block diagrams showing the configuration of an image processing apparatus;

FIG. 3 is a side view showing the whole endoscope apparatus;

FIG. 4 is a block diagram showing the configuration of an input/output unit for the image processing apparatus;

FIG. 5 is a flowchart for explaining the processing flow in the first embodiment;

FIG. 7 is an explanatory diagram showing an image with a halation area;

FIG. 8 is an explanatory diagram showing a selected correction area containing the halation area shown in FIG. 7;

FIG. 9 is an explanatory diagram showing the corresponding points detected in an image Gn;

FIG. 12 is an explanatory diagram showing the result of padding part of the halation area in the image G0;

FIG. 13 is a flowchart showing the contents of processing by the image processing apparatus employing a color matching procedure;

FIG. 16 is a flowchart showing the contents of field enlargement by the image processing apparatus;

FIG. 17 is a flowchart showing the contents of field enlargement by the image processing apparatus employing the color matching procedure;

FIGS. 18 to 25 relate to the second embodiment;

FIG. 18 is a side view showing a stereo endoscope apparatus entirely;

FIG. 19 is a block diagram showing the configuration of the stereo endoscope apparatus;

FIG. 20 is a block diagram showing the configuration of an image processing apparatus;

FIG. 21 is a flowchart showing the contents of processing by the image processing apparatus;

FIG. 22 is a flowchart showing the contents of processing by the image processing apparatus employing a color matching procedure;

FIG. 23 is an explanatory diagram of image synthesis by the processing shown in FIG. 21;

FIG. 24 is a flowchart showing the contents of field enlargement by the image processing apparatus;

FIG. 25 is a flowchart showing the contents of field enlargement by the image processing apparatus employing the color matching procedure;

FIGS. 26 and 27 relate to the third embodiment of the invention;

FIG. 26 is a flowchart showing the contents of processing by the image processing apparatus;

FIG. 27 is a flowchart showing the contents of processing by the image processing apparatus employing the color matching procedure;

FIGS. 28 to 34 relate to the fourth embodiment of the invention;

FIG. 28 is a flowchart showing the contents of processing;

FIG. 29 shows an endoscope to be moved vertically towards an imaging object;

FIG. 31 is a flowchart showing the contents of processing by the image processing apparatus employing the color matching procedure;

FIGS. 32(a) and 32(b) are explanatory diagrams showing an image Gn-1 enlarged to match with an image Gn;

DETAILED DESCRIPTION OF THE PREFERRED EMBODIMENTS

Figure 3:
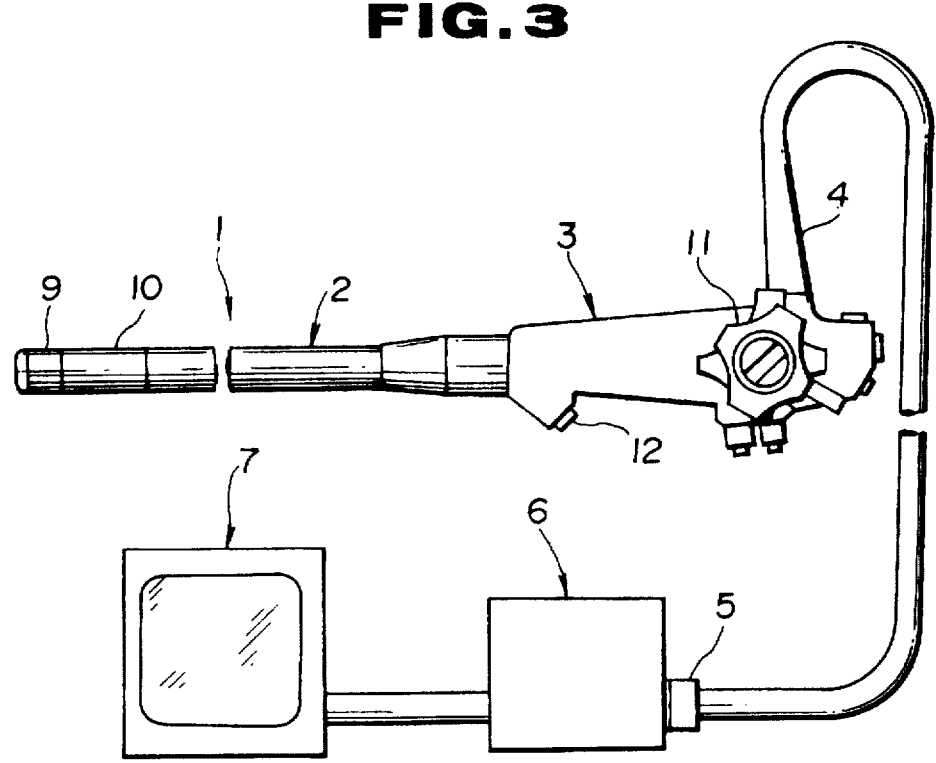

An endoscope apparatus according to the first embodiment has an electronic endoscope 1 as shown in FIG. 3. The electronic endoscope 1 includes an elongated and, for example, flexible insertion tube 2. A large-diameter operation unit 3 is coupled to the back of the insertion tube 2. A flexible universal cord 4 extends laterally from the back of the operation unit 3. A connector 5 is attached to the tip of the universal cord 4. The electronic endoscope 1 is connected to a light source and a video processor 6 having a built-in signal processing circuit via the connector 5.

A rigid distal end 9 is installed on the distal side of the insertion tube 2, and a bending section 10 capable of bending is adjoining behind the distal end 9. The bending section 10 can be bent laterally or vertically by rotating a curvature control knob 11 formed on the operation unit 3. The operation unit 3 is provided with an insertion port 12 leaking to a treatment adapter channel formed in the insertion tube 2.

As shown in FIG. 1, a light guide 14 for transmitting illumination light runs through the insertion tube 2 of the electronic endoscope 1. The tip plane of the light guide 14 is arranged at the distal end 9 of the insertion tube 2, so that illumination light can be emitted from the distal end 9. The incident end of the light guide 14 is routed through the universal cord 4 and connected to the connector 5. An objective lens system 15 is installed at the distal end 9, and a solid-state imaging device 16 is arranged at the image forming position of the objective lens system 15. The solid-state imaging device 16 is sensitive to wavelengths in a broad band ranging from an ultraviolet region through a visual spectrum to an infrared region. Signal lines 26 and 27 are connected to the solid-state imaging device 16, which are routed through the insertion tube 2 and universal cord 4 and connected to the connector 5.

On the other hand, a lamp 21 for emitting broad-band light covering from ultraviolet light to infrared light is installed in a video processor 6. An ordinary xenon lamp or strobe lamp can be used as the lamp 21. The xenon lamp or strobe lamp emits a large quantity of ultraviolet and infrared light as well as visible light. Power is supplied to the lamp 21 by a power supply 22. A rotary filter 50 driven to rotate by a motor 23 is arranged forward of the lamp 21. Normal observation filters for transmitting light with wavelengths of red (R), green (G), and blue (B) are set in array along the circumference of the rotary filter 50.

The rotation of the motor 23 is controlled by a motor driver 25.

Light, which is separated time-sequentially into R, G, and B wavelengths by passing through the rotary filter 50, enters the incident end of the light guide 14, travels along the light guide 1 to the distal end 9, then goes out from the distal end. Then, the light illuminates an observation region.

Part of the illumination light returning from the observation region is converged on the solid-state imaging device 16, then transferred photoelectrically. The solid-state imaging device 16 is provided with a drive pulse sent over the signal line 26 from a drive circuit 31 in the video processor 6. The drive pulse triggers reading or transferring. A video signal read from the solid-state imaging device 16 passes through the signal line 27, then enters a preamplifier 32 installed in the video processor 6 or the electronic endoscope 1.

The video signal amplified by the preamplifier 32 enters a process circuit 33, then undergoes gamma correction, white balancing, and other signal processing. Then, the video signal is converted into a digital signal by an A/D converter 34. The digital video signal is stored selectively in a memory (1) 36a, memory (2) 36b, or memory (3) 36c corresponding to red (R), green (G), and blue (B). The memory (1) 36a, memory (2) 36b, and memory (3) 36c are read concurrently. The read signals are converted into analog signals by a D/A converter 37, then supplied as R, G, and B signals to a color monitor 7 via an input/output interface 38. The color monitor 7 displays the observation region in color.

A timing generator 42 for generating timings for the whole system is installed in the video processor 6. The timing generator 42 synchronizes the motor driver 25, drive circuit 31, selector 35, and other circuits.

In this embodiment, the output terminals of the memories (1 to 3) 36a to 36c are connected to an image processing apparatus 104. The image processing apparatus 104 is connected to a monitor 106 via an input/output interface 105. The monitor 106 displays the results of arithmetic operations performed by the image processing apparatus 104.

The image processing apparatus 104 has a configuration shown in FIG. 2.

The image processing apparatus 104 comprises, as shown in FIG. 2(a), a CPU 121, an information input unit 122, a main storage 123 made up of a RAM, an image input interface 125, a display interface 128, and a ROM 130. These components are connected to another on a bus.

The CPU 121 has, as shown in FIG. 2(b), an image processing means which operates according to programs stored in the ROM 130. The image processing means comprises, for example, a corresponding point detection means 141 for detecting corresponding points in multiple images, an image matching means for matching at least two images according to the output result of the corresponding point detection means, and an image synthesizing means 143 for synthesizing at least part of at least one image portion with at least part of image information of other images to form a single image.

The information input unit 122 is a keyboard for entering the type of the electronic endoscope 1 and other data. The image input interface 125 is connected to the memory (1) 36a, memory (2) 36b, and memory (3) 36c, and receives image data from the memories. The display interface 128 is connected to the input/output interface 105, and transmits input image data to the monitor 106.

In this embodiment, images of observation objects the electronic endoscope 1 provides are processed by the image processing apparatus 104, then the results of the processing are displayed on the monitor 106.

Figure 4:
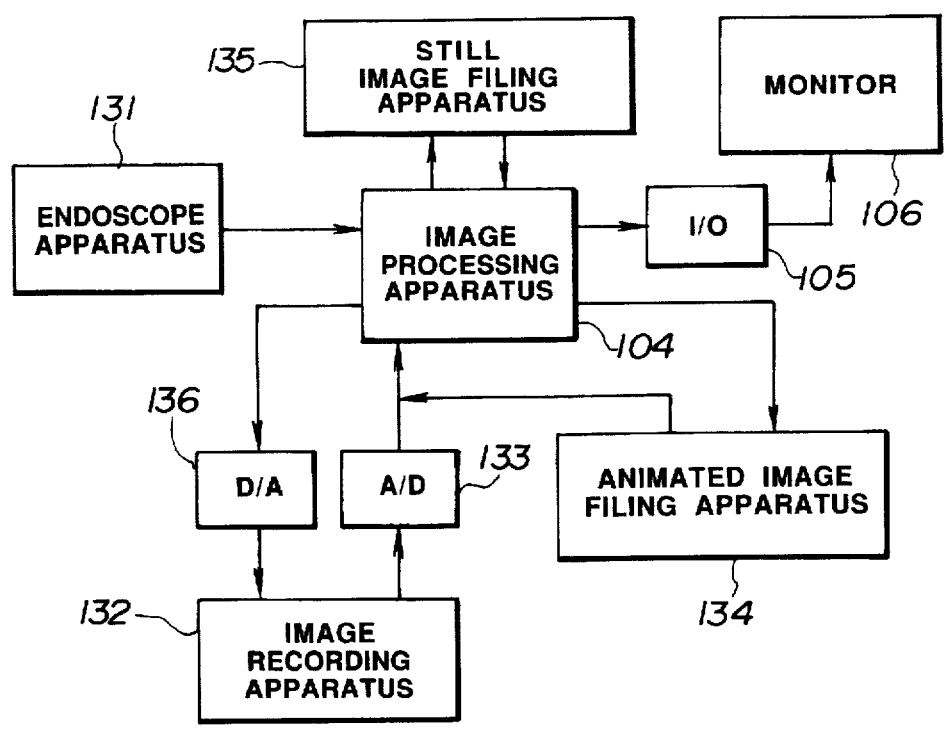

The image processing apparatus 104 is provided with input images by not only an endoscope apparatus but also, for example, an analog or digital magneto-optic disk, VTR, optical disk, animated image memory, and other input units. FIG. 4 is a block diagram in anticipation of those input units. An endoscope apparatus 131 represents the endoscope. An image recording apparatus 132 represents the VTR, or analog magneto-optic disk or other analog image recorder. The output of the image recording apparatus 132 is converted into a digital image by an A/D converter 133, then the digital image is supplied to the image processing apparatus 104. A D/A converter 136 may be installed so that the the images processed by the image processing apparatus 104 can be recorded in the image recording apparatus 132.

An animated image filing unit 134 represents a semiconducting memory, hard disk, or digital magneto-optic disk, whose output is supplied as a digital image to the image processing apparatus 104. A still image filing unit 135 is similar to the animated image filing unit 134 and provides the image processing apparatus 104 with digital still images.

The animated image filing unit 134 and still image filing unit 135 may be able to record the images processed by the image processing apparatus 104.

Next, the operations of the image processing apparatus 104 will be described. In this embodiment, a luminescent spot (synonym of halation) area is eliminated. For the elimination, a luminescent spot deriving from regular reflection is recognized as a regional abnormal area specific to each image. The range and position where the luminescent spot appears varies depending on the relative positional relationships between an observation object and a diagnostic illumination light emitting position and observation position, and the angle of the observation object plane. Specifically, the position and area of a luminescent spot vary depending on the movement or motion of an endoscope tip and an object. When a living body is observed, some of the images produced may be covered with a luminescent spot, while others may not. At least one of multiple images acquired from the same object is not covered with a luminescent spot, the images are aligned by detecting corresponding points in them, the deformed portions are corrected, then only normal image data is used to provide a synthetic image. When image data is aligned, deformation is corrected, then the resultant image data is put together, an image with a wide field of view is synthesized.

In image synthesis according to the first embodiment, a halation area is padded with a corresponding portion of another image (in which halation does not reside). The image synthesis is based on data restoration by mosaic padding using a block matching procedure. Specifically, assuming that a moving endoscope provides continuous time-series images X0 to Xn (n=1, 2, 3, etc.), a region lost by halation in an image X0 is padded with corresponding regions of images X1 to Xn. The underlying fact is that the position of an halation area differs from image to image. Using this procedure, the images X0 to Xn are concatenated to provide a new still image with a field of view (range an object is visualized in a signal image) enlarged.

For image padding or concatenation, a G image, for example, of R, G, and B images may be aligned first, then the remaining R and B images may be matched to the G image. Alternatively, corresponding points are specified in R, G, and B images individually, then the corresponding points are used to align or concatenate the images. A block matching procedure to be applied may be a well-known cross-correlation matching procedure (reference literature: Tezuka K, Kitahashi D, Ogawa H. Digital Image Processing Engineering. Nikkan Kogyo Shinbun; 107–109).

The color matching procedure this applicant has disclosed U.S. Pat. No. 4,962,540 may be adopted for the foregoing block matching.

FIG. 5 is a flowchart showing the specific processing flow of this embodiment. The contents of alignment using a G image as a reference image will be described in conjunction with FIG. 5.

At a step S1, n=0 is specified for G images Gn of images Xn (n=0, 1, 2, etc.). At a step S2, an image specified with n=0 or an image G0 is fetched. Then, the image G0 undergoes noise elimination using a median filter having, for example, a 3 by 3 mask at a step S3.

Figure 6A:
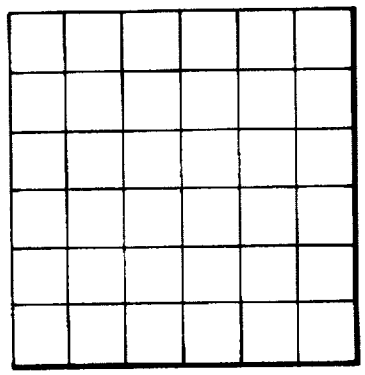
FIGS. 6(a) and 6(b) are explanatory diagrams showing corrected distortion and aberration.
Figure 6B:
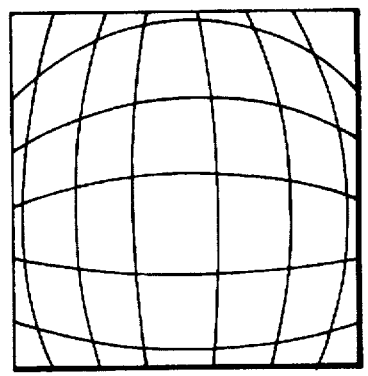

A raw image is distorted when a wide-angle lens is used or the distal end of an endoscope is tilted. Therefore, distortion and aberration correction is performed on the raw image at a step S4, so that the distortion will be corrected. Assuming that a square lattice pattern shown in FIG. 6(a) is imaged with an endoscope, the acquired image will appear as shown in FIG. 6(b). A correction value is predetermined for each pixel, then the predetermined values apply to an actually acquired image to thus correct distortion and aberration correction. As a result, the distorted image shows an exact square lattice. More particular procedures have been disclosed in Literature 2 (U.S. Pat. No. 4,895,431).

To an image processed by distortion and aberration correction, halation area extraction is executed at a step S5. The specific contents of the operation will be described as an example below.

Binarization is performed according to a dynamic threshold determination method in which a binary threshold is determined by measuring a deviation of a value near a pixel of interest from an average. First, an area in which halation is recognized is specified in an image. Then, the specified area is dilated. Finally, the dilated area including the surrounding area of the area which is thought to be affected by halation is extracted as a halation area.

Figure 7:
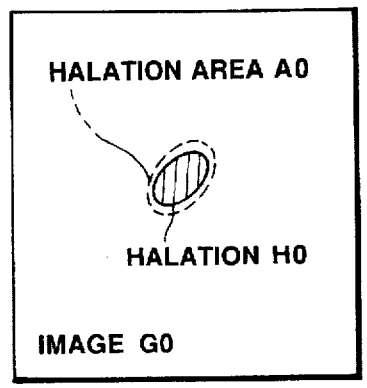

FIG. 7 shows an example of an extracted halation area A0 of an image G0. A halation area A0 indicated with a dashed line is extracted, including a halation H0 or a shaded area and a region which is thought to be affected by the halation.

The halation area A0 is extracted from the image G0 by performing halation removal area determination. For images Gn in which n is equal to or larger than 1, the halation removal area determination extracts areas which are not involved in area padding based on image synthesis to be performed at a step S11. When extracting the halation area A0 at the step S5 is complete, it is determined at a step S6 whether n is equal to 0. In this case, n is equal to 0. Therefore, n is incremented to be 1 at a step S7. After n=1 is specified, control returns to a step S2. An image specified with n=1 or an image G1 is fetched. After that, control passes to S8 after determination is made at the steps S3 to 5, and 6.

At the step S8, four points A, B, C, and D serving as apices of, for example, a quadrangle including the extracted halation area A0 (hereafter, the internal area of the quadrangle is referred to as a correction area HD) are specified as correspondence detection points in the image G0. For the points, block matching areas Va, Vb, Vc, and Vd each having a size of 32 by 32 are determined with the correspondence detection points A, B, C, and D as the centers. Halation removal is achieved by performing padding which is based on block matching for the above four points in consecutive images succeeding an image X0.

Figure 8:
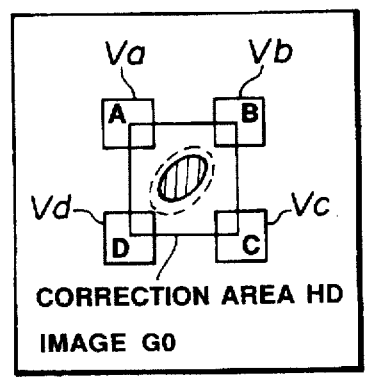

Therefore, the correspondence detection points A, B, C, and D must be selected so that areas used for block matching will not overlap a halation extraction area of an image Gn but have apparent patterns (for example, areas in which patterns are crowded). FIG. 8 shows an example of the correspondence detection points A, B, C, and D, and block matching areas Va, Vb, Vc, and Vd, which have been determined for the example shown in FIG. 7.

Next, at a step S9, corresponding points (matching points) are detected relative to the image G0. In this operation, points corresponding to the correspondence detection points A, B, C, and D determined at the step S8 (hereafter, corresponding points) are picked up from an image Gn. Specifically, areas corresponding to block matching areas Vi centered on correspondence detection points I (I=A, B, C, and D) which have been specified in the image G0 at the step S8 are extracted by performing block matching, then points corresponding to the correspondence detection points I are specified in an image Gn.

For the image Gn, it is determined at a step S10 whether block matching for the correspondence detection points terminates normally. This operation is achieved as follows: when block matching is executed, the highest peak value on a correlation plane is compared with a peak value which is the second highest. Then, if the difference is less than a certain threshold M, a detection error is identified. This lies in the fact that when the correlation between two areas to be matched is higher, the highest peak value on the correlation plan becomes larger, and the other peak values, very smaller. If a detection error is identified, the operation of the step S8 restarts. Then, correspondence detection points and block matching areas are specified in the image G0. After that, the operation of the step S9 reruns.

Figure 9:
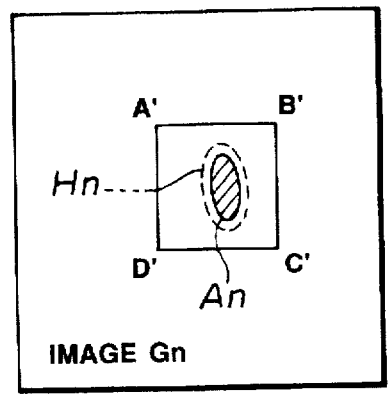

After the corresponding points corresponding to the correspondence detection points are picked up, image synthesis is executed at a step S11. FIG. 9 shows an example of corresponding points A' to D' in the image Gn which have been picked up relative to the correspondence detection points A to D in the image G0 shown in FIG. 8. An internal area defined with these corresponding points A' to D' contains an area An corresponding to the halation area A0 in the image G0 and an area Hn corresponding to the halation H0. Herein, the contents of image synthesis will be described using this example.

The positions of points in a quadrangle A'B'C'D' defined with the corresponding points A' to D' in the image Gn, which correspond to the points of the halation H0 included in the halation area A0 in the image G0, are determined by performing mapping equivalent to deformation from the quadrangle ABCD to the A'B'C'D'.

Figure 10A:
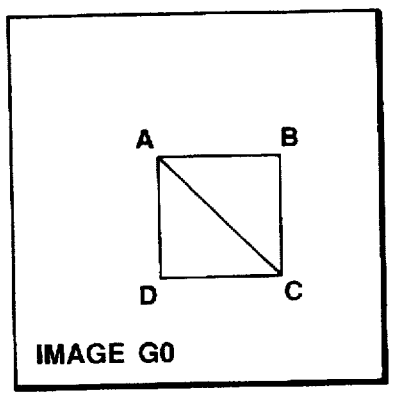
FIGS. 10(a) and 10(b) are explanatory diagrams showing the correspondence detection points in an image G0 and the corresponding points in the image Gn.
Figure 10B:
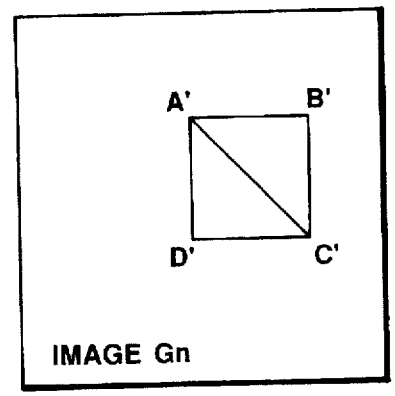
Figure 11A:
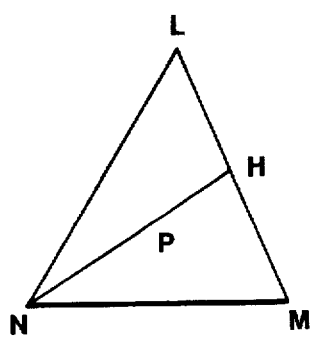
FIGS. 11(a) and 11(b) are explanatory diagrams of position determination for a point P in an area specified with the corresponding points.

First, the quadrangles ABCD and A'B'C'D' are assumed to comprise, as shown in FIGS. 10(a) and 10(b), triagles BCA and CAD, and triangles B'C'D' and C'A'D' respectively. For example, as shown in FIG. 11(a), a point P in a triangle LMN is defined as H:HM and NP:PH with respect to a side LM and an intersection H of a segment passing a point N and a point P with the side LM. Thereby, in a rectangle triangle (not shown) corresponding to the triangle LMN, a point P' corresponding to the point P is defined to meet LH:HM= L'H':H'M' and NH:NP=N'H':N'P'.

Under the above conditions, points in the internal areas of two pairs of corresponding triangles shown in FIGS. 10(a) and 10(b) are correlated one another to determine the positions. When the point P resides outside the triangle LMN, a corresponding point can be positioned in an L'M'N' in the same manner. Therefore, this operation can apply to field enlargement to be mentioned later.

Figure 11B:
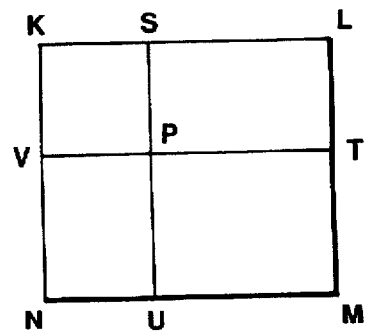

The quadrangles ABCD and A'B'C'D' can be aligned in such a way that a point P' in a quadrangle K'L'M'N' (not shown) corresponding to a point P in a quadrangle KLMN is determined, as shown in FIG. 11(b), to meet the following conditions:

KS:SL=K'S':S'L'

LT:TM=L'T':T'M'

MU:UN=M'U':U'N'

NV:VK=N'V':V'K'

The value of the point P is assigned to the corresponding point P' calculated by the aforesaid alignment. If a directly corresponding point P does not reside, the value of a point near the point P is used to perform, for example, well-known linear interpolation. Then, the calculated value is assigned to the corresponding point P'. The ongoing description is concerned with a G image. The alignment may, needless to say, apply to R and B images.

Figure 12:
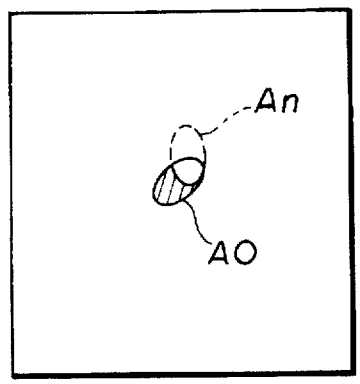

After position determination is complete, if a point Qn in the image Gn corresponding to a point Q0 or a halation pixel in the halation area in the image G0 is not existent in the halation Hn in the image Gn; that is, a point corresponding to a lost point in the image G0 is visualized correctly in the image Gn, an operation of assigning the density of the point Qn in each of R, G, and B images forming an image Xn to a point Q0 in each of R, G, and B images forming an image X0 is performed on all points in the halation area A0. FIG. 12 shows an example of the result of padding an image G0 with an image Gn. Halation is removed from part of the halation area A0 or a shaded area.

In images R0 and Rn, or images B0 and Bn, padding can be performed on points corresponding to the points correlating the images G0 and Gn.

Then, at a step S12, it is determined whether removing the halation area A0 from the image G0 terminates normally. If not, n is incremented by 1. Then, control returns to the step S2. A new image Gn is handled similarly.

A series of operations of the steps S2 to S11 is repeated until the halation area A0 in the image G0 or image X0 disappears perfectly. Thus, image synthesis provides an image without halation. Then, this processing can be terminated.

Even when a series of operations shown in the flowchart of FIG. 5 is performed on each of R, G, and B images, the aforesaid advantages will also be ensured.

FIG. 13 shows a processing flow for using a color matching procedure which is detailed as a corresponding point detection procedure for R, G, and B images in Literature 1. The fundamental flow and contents of the processing are identical to those shown in FIG. 5. According to this processing, block matching can be performed directly on color images X0 to Xn. That is to say, the operations of the steps S1 to S8 in FIG. 5 are performed on an image Xn at steps S21 to S28. At a step S29, corresponding points relative to a color image X0 are detected in a color image Xn using the color matching procedure. After this detection, corresponding points can be specified in R, G, and B images simultaneously. Next, the operations corresponding to those at the steps S10 to S12 in FIG. 5 are executed at steps S30 to S32 to provide an image without halation.

Figure 14A:
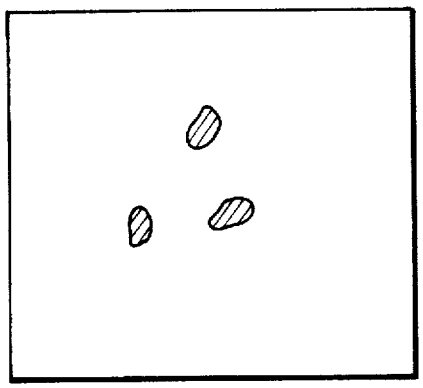
FIGS. 14(a) and 14(b) are explanatory diagrams showing correspondence detection points and block matching areas specified for multiple halation areas which reside mutually closely.

In the aforesaid halation removal, if multiple halation areas reside relatively closely in the image X0 as shown in FIG. 14, correspondence detection points and block matching areas are specified at the step S8 or S28 as described below.

Figure 14B:
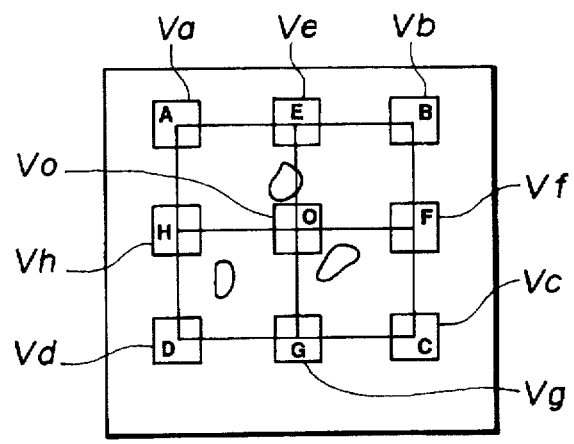

First, as shown in FIG. 14(b), points A, B, C, and D are selected as, for example, the apices of a quadrangle enclosing multiple halation areas. Then, points E, F, G, and H are determined on the sides of the quadrangle ABCD. An intersection of EG and FH is represented as 0. Next, apices of each of a quadrangle AEOH, a quadrangle EBFO, a quadrangle FCGO, and a quadrangle GDHO are recognized as correspondence detection points. The aforesaid block matching areas Va, Vb, Vc, Vd, Ve, Vf, Vg, Vh, and Vo are determined. Then, at the step S9 or step S29, corresponding points are detected in the image Gn or Xn. This detection applies to the points A to H and 0.

After corresponding points A' to H' and O' (not shown) are detected in the image Gn or Xn, each of a quadrangle A'E'O'H', a quadrangle E'B'F'O', a quadrangle F'C'G'O', and a quadrangle G'D'H'O' is mapped to determine the positions of the corresponding points as described previously. Then, the halation areas are padded.

Figure 15A:
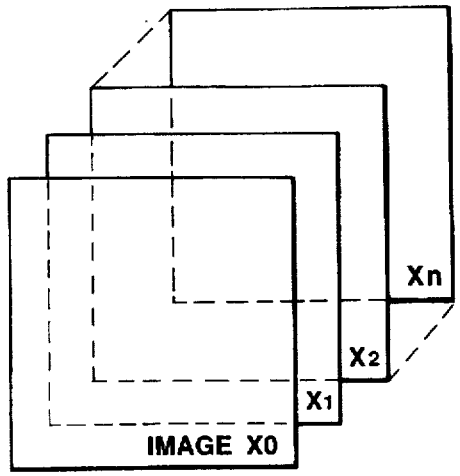
FIGS. 15(a) and 15(b) show the positional relationships among multiple images and an image providing an enlarged field of view.
Figure 15B:
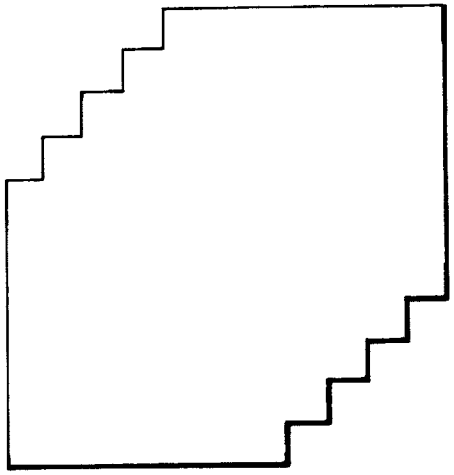

When the processing of this embodiment is executed to provide images without halation, if the time-series images X0 to Xn are concatenated, the field of view can be enlarged. FIG. 15(a) shows an example of a positional relationship between the images X0 to Xn and an imaging object. Thus, concatenating the images provides an image having an enlarged field of view as shown in FIG. 15(b). FIG. 16 is a flowchart showing the processing flow.

The processing flow shown in FIG. 16 is based on the processing shown in FIG. 5. After an image Gn is fetched at a step S42, the same operations as those at the steps S8 to S10 in FIG. 5 are performed at steps S45 to 47. Then, corresponding points relative to an image G0 are detected in the image Gn. After corresponding point detection succeeds, the image Gn is concatenated to the image G0.

The operation executed at the step S11 in FIG. 5 is used for the foregoing concatenation. For example, three correspondence detection points E to G (not shown) and block matching areas are first specified in the image G0, then corresponding points E' to G' (not shown) are picked up from the image Gn in the same manner as the operation at the step S9 in FIG. 5. Then, the positions of triangles EFG and E'F'G' are determined in the same manner as the position determination at the step S11 in FIG. 5.

After image concatenation is complete at a step S48, it is determined at a step S49 whether concatenation has terminated. If concatenation continues, a concatenated image is recognized as a new image G0. Then, the operations at the steps S42 to S49 are repeated.

In images R0 and Rn or images B0 and Bn, concatenation can be performed on points corresponding to the points correlating the image G0 and image Gn.

Even when a series of operations in the flowchart of FIG. 16 applies to each of images R, G, and B, the aforesaid advantages will also be ensured.

Figure 17:
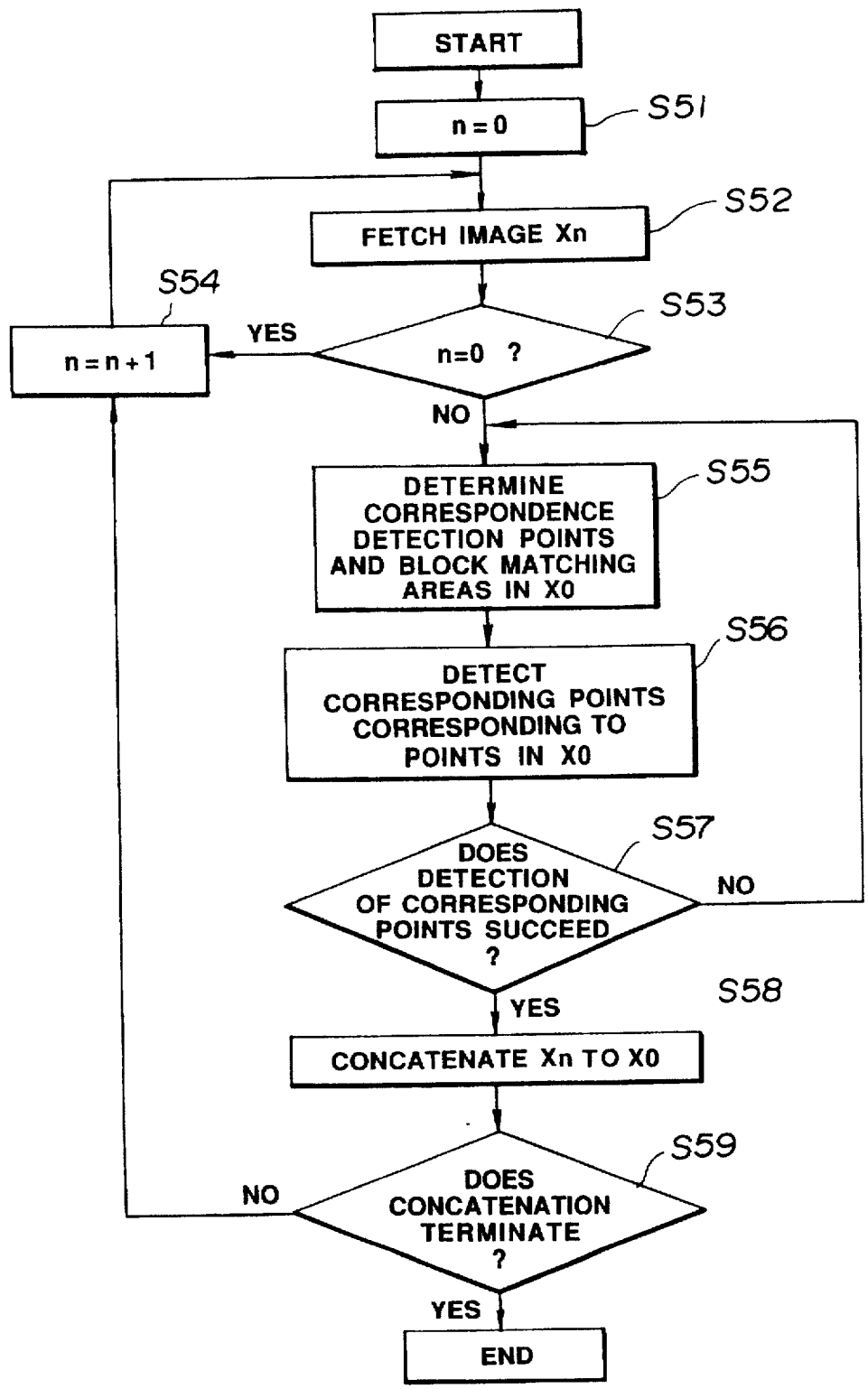

FIG. 17 shows a processing flow for using a color matching procedure detailed as a corresponding point detection procedure for R, G, and B images in Literature 1. The fundamental flow and contents of the processing are identical to those shown in FIG. 16. In this processing, block matching can be performed directly on color images X0 to Xn. Specifically, the operations at the steps S41 to S45 in FIG. 16 are performed on an image Xn at steps S51 to S55. At a step S56, corresponding points relative to the image X0 are detected in the image Xn using the color matching procedure. This procedure makes it possible to specify corresponding points in R, G, and B images at a time. Next, the operations corresponding to those at the steps S47 to S49 are performed at steps S57 to S59. Finally, an image having an enlarged field of view is produced.

According to the processing of this embodiment, after an activation command signal issued from, for example, an information input unit 122 is received, several images are handled to display the resultant image on the monitor 106.

The aforesaid processing has the advantage of providing images with halation removed, which will prove effective in diagnostic practice. This embodiment provides images having enlarged fields of view.

In this embodiment, continuous images are handled. However, images to be handled may be selected, for example, every other image or at random. In this embodiment, an image G0 is synthesized with images Gn (n=1, 2, 3, etc.) to provide an image without halation or an enlarged field of view. The image to be synthesized is not confined to the image G0. An image Gm specifying $0 </= m </= n$ may be padded with an image acquired immediately before or/and after the image Gm as described previously.

Next, the second embodiment of the present invention will be described.

In the second embodiment, halation removal and field enlargement described in the first embodiment apply not only to time-series images acquired by a moving endoscope but also to multiple images acquired using multiple optical systems; that is, an optical system R and an optical system L.

Figure 18:
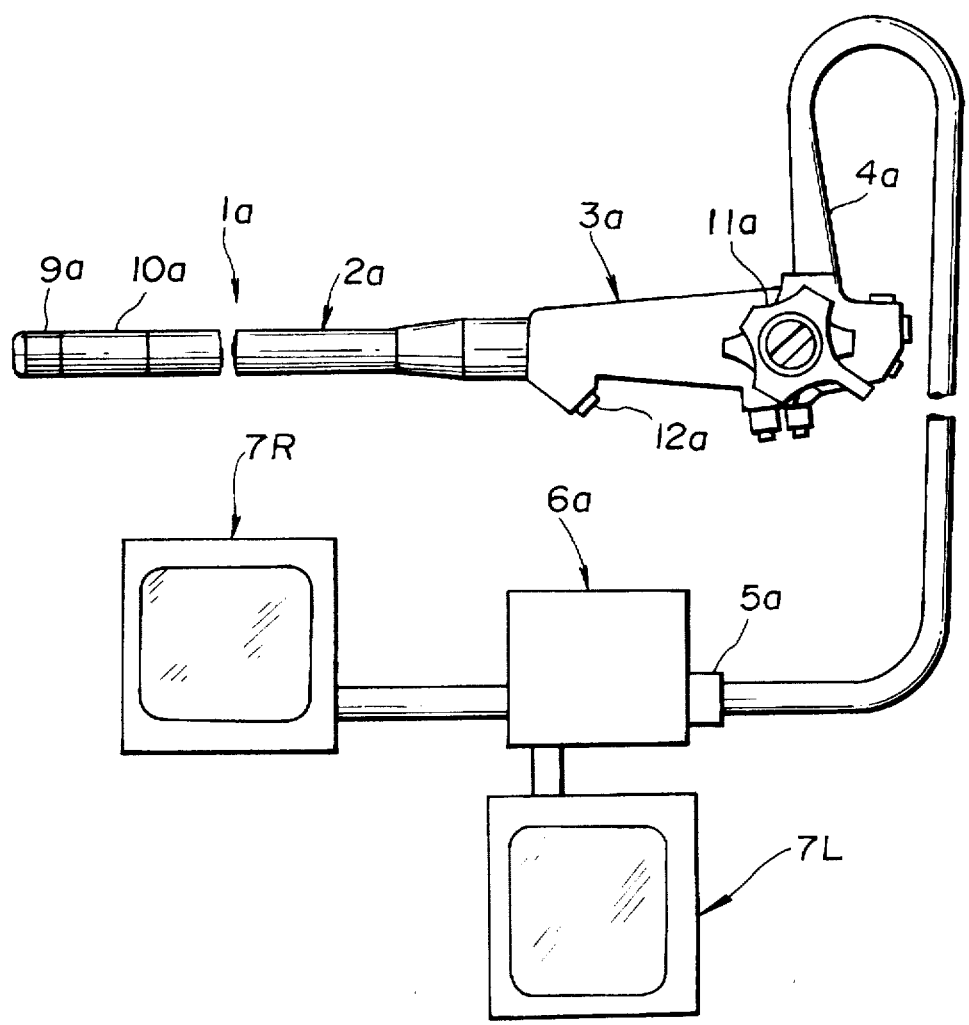

An endoscope apparatus according to this embodiment is, as shown in FIG. 18, equipped with an electronic endoscope 1a. This electronic endoscope 1a has an elongated and, for example, flexible insertion tube 2a. A large-diameter operation unit 3 is coupled to the back of the insertion tube 2a. A flexible universal cord 4a is extending laterally from the back end of the operation unit 3a. A connector 5a is installed at the distal end of the universal cord 4a. The electronic endoscope 1a is connected to a light source and a video processor 6a having a built-in signal processing circuit via the connector 5a. The video processor 6 is connected to monitors 7R and 7L.

On the distal side of the insertion tube 2a, a rigid distal end 9a, and a bending section 10a which is capable of bending and adjoining behind the distal end 9a are installed. side by side. The bending section 10a can be bent laterally or vertically by rotating a curvature control knob 11a formed on the operation unit 3a. The operation unit 3a is provided with an insertion port linking to a treatment adapter channel formed in the insertion tube 2a.

Figure 19:
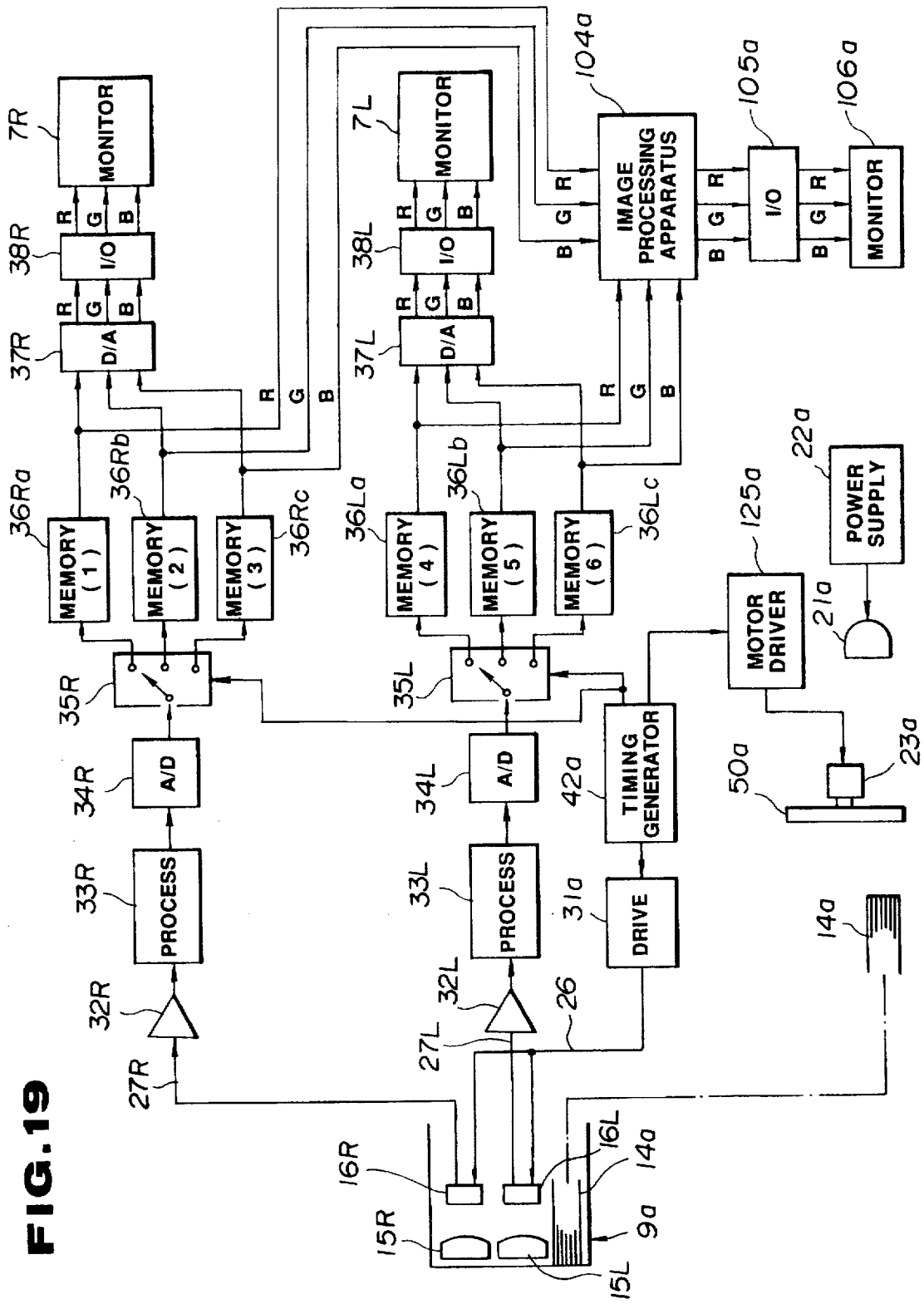

As shown in FIG. 19, a light guide 14a for propagating illumination light is running through the insertion tube 2a of the electronic endoscope 1a. The end surface of the light guide 14a is arranged at the distal end 9a of the insertion tube 2a, so that illumination light can be emitted from the distal end 9a. The incident end of the light guide 14a runs through the universal cord 4a and ends at the connector 5a. The distal end 9a is provided with objective lens systems 15R and 15L. Two pairs of solid-state imaging devices 16R and 16L are arranged at the image forming positions of the objective lens systems 15R and 15L. The solid-state imaging devices 16R and 16L are sensitive to wavelengths in a broad band ranging from an ultraviolet region through a visible spectrum to an infrared region. The solid-state imaging devices 16R and 17L are connected to signal lines 26, 27R, and 27L. The signal lines 26, 27R, and 27L run through the insertion tube 2a and universal cord 4a, and end at the connector 5a.

On the other hand, the video processor 6a is equipped with a lamp 21a for emitting broad-band light covering from ultraviolet light to infrared light. An ordinary xenon lamp or strobe lamp may be used as the lamp 21a. The xenon lamp or strobe lamp emits not only visible light but only a large amount of ultraviolet and infrared light. The lamp 21a is supplied power by a power supply 22a. A rotary filter 50a driven to rotate by a motor 23a is arranged forward of the lamp 21a. Normal observation filters for transmitting light of wavelengths of red (R), green (G), and blue (B) are set in array in the circumferential direction of the rotary filter 50a.

The rotation of the motor 23a is controlled by a motor driver 25a.

Light, which is separated time-sequentially into R, G, and B wavelengths by passing through the rotary filter 50a, enters the incident end of the light guide 14a, travels along the light guide 14a to the distal end 9a, then comes out from the distal end 9a. Thus, an observation region is illuminated.

Part of the illumination light returning from the observation region is converged on the solid-state imaging devices 16R and 16L by the objective lens systems 15R and 15L, then transferred photoelectrically. The solid-state imaging devices 16R and 16L are provided with drive pulses sent over the signal line 26 from a drive circuit 31a in the video processor 6a. The drive pulse triggers reading and transfer. Video signals read from the solid-state imaging devices 16R and 16L are sent over the signal lines 27R and 27L, then fed to preamplifiers 32R and 32L installed in the video processor 6a or electronic endoscope 1a.

The video signals amplified by the preamplifiers 32R and 32L enter process circuits 33R and 33L, then undergo gamma correction, white balancing, and other signal processing. Then, the video signals are converted into digital signals by A/D converters 34R and 34L. The digital video signals are stored selectively in a memory (1) 36Ra, memory (2) 36Rb, or memory (3) 36Rc, and a memory (4) 36La, memory (5) 36Lb, or memory (6) 36Lc, which correspond to red (R), green (g), or blue (B), by select circuits 35R and 35L. The memory (1) 36Ra, memory (2) 36Rb, and memory (3) 36Rc, and the memory (4) 36La, memory (5) 36Lb, and memory (6) 36Lc are read concurrently. The read data is converted into analog signals by D/A converters 37R and 37L, then supplied as R, G, and B signals to color monitors 7R and 7L via input/output interfaces 38R and 38L. Then, the color monitors 7R and 7L display the observation region in color.

A timing generator 42a for generating timings for the whole system is incorporated in the video process, which synchronizes the motor driver 25a, drive circuit 31a, and select circuits 35R and 35L.

In this embodiment, the output terminals of the memories (1 to 3) 36Ra to 36Rc, and memories (4 to 6) 36La to 36Lc are connected to an image processing apparatus 104a. The image processing apparatus 104a is connected to a monitor 106a via an input/output interface 105a. The monitor 106a displays the results of arithmetic operations by the image processing apparatus 104.

Figure 20:
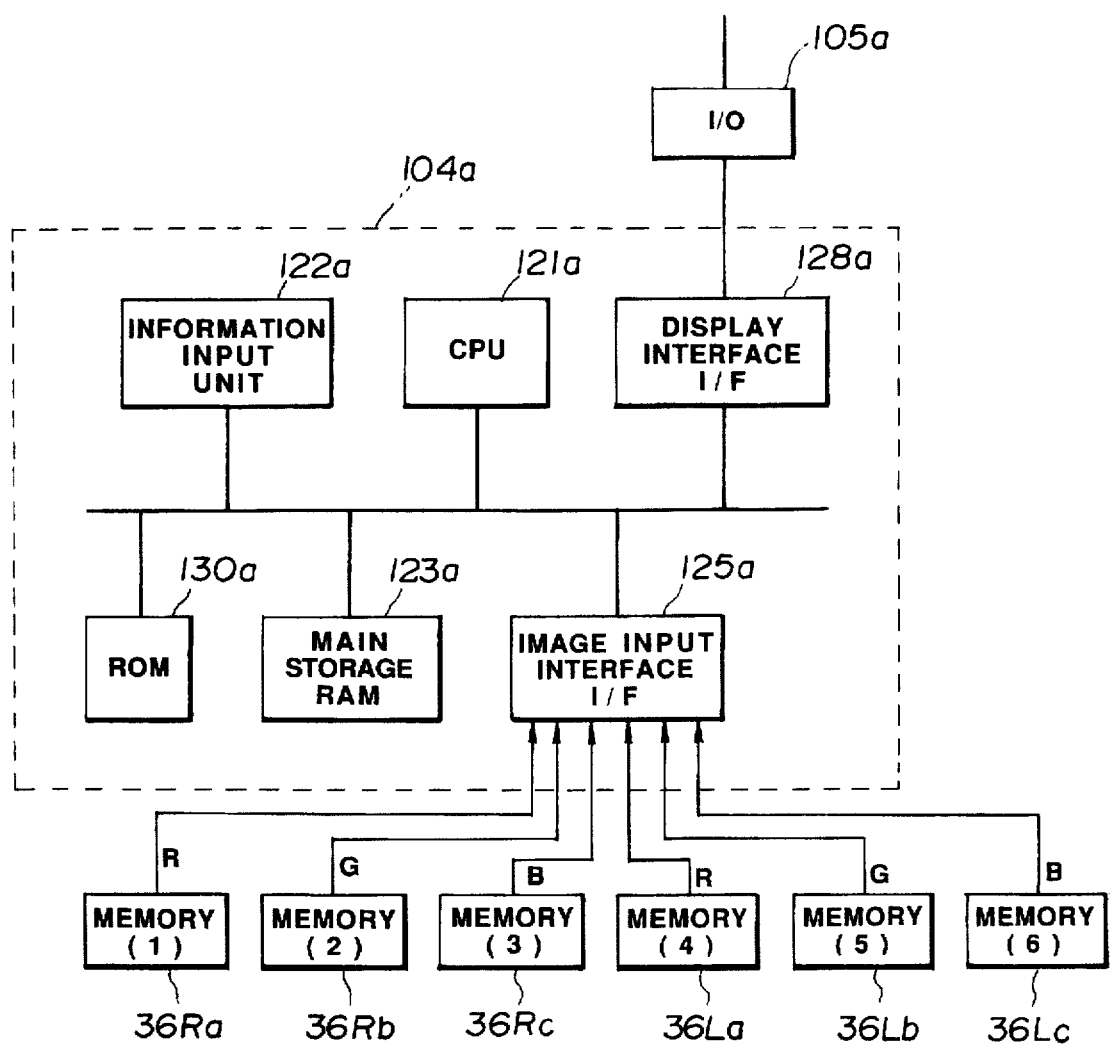

The image processing apparatus 104a has a configuration shown in FIG. 20.

Specifically, the image processing apparatus 104a comprises a CPU 121a, an information input unit 122a, a main storage 123a made up of a RAM, an image input interface 125a, a display interface 128a, and a ROM 130a. These components are connected mutually on a bus. The information input unit 122a is a keyboard for entering data; such as, the type of the electronic endoscope 1a. The image input interface 125a is connected to the memory (1) 36Ra, memory (2) 36Rb, and memory (3) 36Rc, and the memory (4) 36La, memory (5) 37Lb, and memory (6) 36Lc, and receives image data from the memories. The display interface 128a is connected to the input/output interface 105a, and transmits input image data to the monitor 106a.

The CPU 121a is, similarly to that for the first embodiment, provided with an image processing means which operates according to programs stored in the ROM 130a as shown in FIG. 2(b). The image processing means comprises, for example, a corresponding point detection means 141a for detecting corresponding points in multiple images, an image matching means 142a for matching at least two images according to the output result of the corresponding point detection means, and an image synthesizing means 143a for synthesizing at least one part of at least one image portion with at least part of image information of other images to form a single image.

In this embodiment, images of object regions the electronic endoscope 1a provides are processed by the image processing apparatus 104a, then the processing results are displayed on the monitor 106a.

FIGS. 21 to 25 are flowcharts showing the processing flows of this embodiment and explanatory diagrams. Operations based on the ones applying to time-series images in the first embodiment are performed on N images of images X1 to XN acquired with N optical systems.

Figure 21:
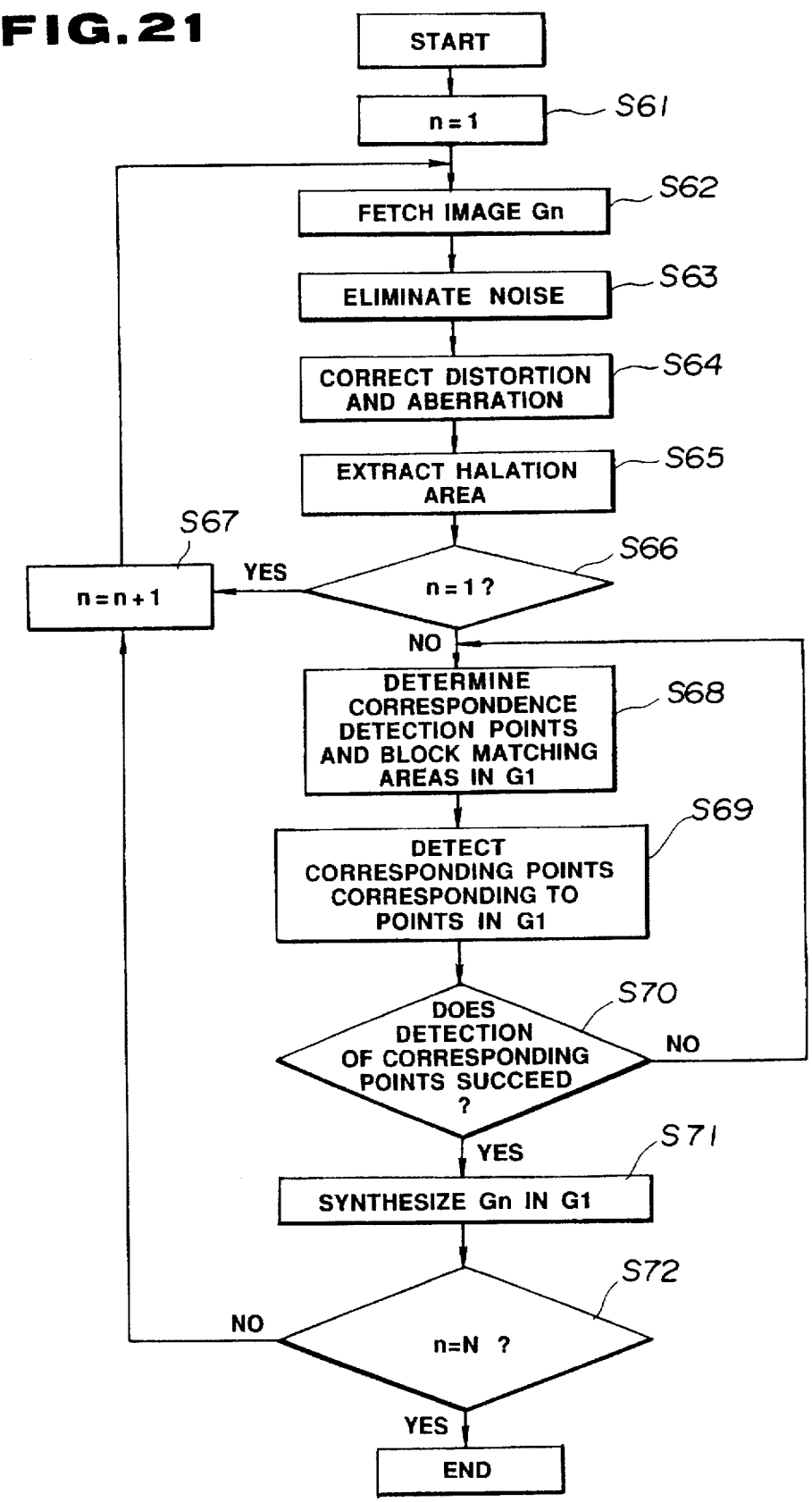

FIGS. 21 and 22 are flowcharts of padding a halation area in the image X1 with the images X2 to XN. In this embodiment, images a stereo endoscope provides are used. Therefore, N equals to 2. Assume that the image X1 is acquired with an optical system R, and the image X2, with an optical system L.

FIG. 21 shows a processing flow of halation removal using the aforesaid cross-correlation matching procedure. In this example, the processing applies to G images G1 and G2 of the images X1 and X2. The image G1 fetched at a step S62 undergoes noise elimination at a step S73, distortion and aberration correction at a step S64, and halation area extraction at a step S65. The operations applied at the steps S3 to S5 in the first embodiment are used for the steps.

After the operations at steps S66 and S67 are complete, an image G2 is fetched at the step S62. Then, the operations at the steps S63 to S65 apply to the image G2. The operations for detecting corresponding points, which are similar to those at the steps S8 to S10 in FIG. 5, are performed at steps S68 to S70. When detecting corresponding points relative to the image G1 in the image G2 succeeds, the image G2 is synthesized in the image G1 at a step S71 to pad the halation area in the G1. In R and B images, padding may be performed directly on points corresponding to the points detected in the G images. Alternatively, a series of operations shown in FIG. 21 may apply to each of R, G, and B images.

FIG. 22 shows a processing flow of the color matching procedure disclosed as a block matching procedure in Literature 1 (U.S. Pat. No. 4,962,540). Herein, the color images X1 and X2 are used to detect corresponding points. After the image X1 (image acquired with the optical system R) is fetched at a step S82, the operations of the steps S63 to S65 are performed at steps S83 to S85. Then, the image X2 (image acquired with the optical system L) is fetched. After the operations of the steps S83 to S85 are complete, the operations of steps S88 to S90 are performed. The operations of the steps S88 to S90 are identical to those of the steps S28 to S30. When corresponding point detection succeeds, the image X2 is synthesized in the image X1. Thus, the halation area is reduced in size.

Figure 24:
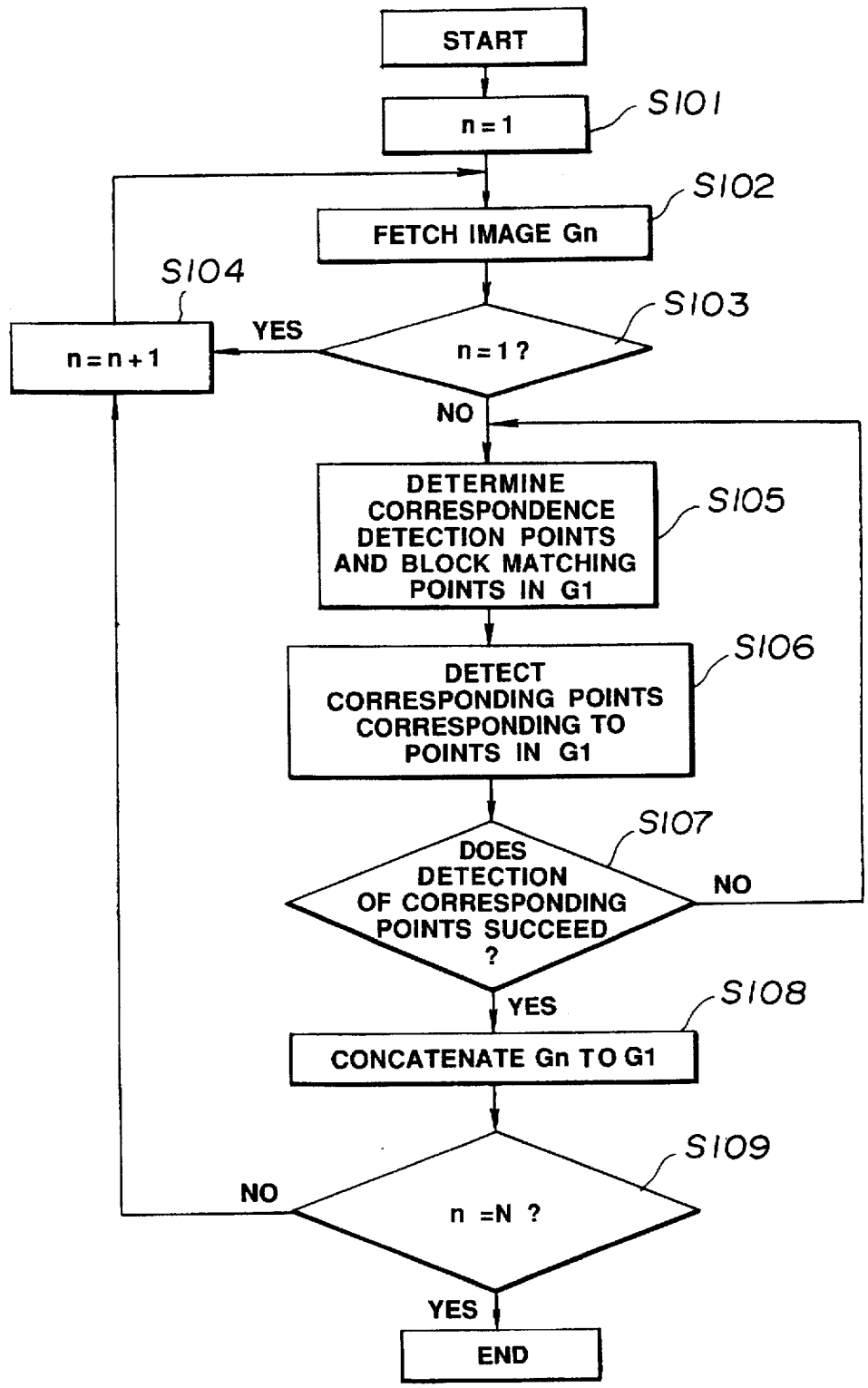

After the processing of this embodiment is executed to provide images without halation, if images X1 to XN are concatenated, the field of view can be enlarged. For example, images XR and XL shown in FIG. 23(a) a stereo endoscope provides are concatenated to provide an image with an enlarged field of view shown in FIG. 23(b). FIG. 24 is a flowchart showing the processing flow.

The processing flow shown in FIG. 24 is based on that shown in FIG. 21. An image G1 or G2 is fetched at a step S102. Then, the operations for detecting corresponding points are performed on the image G1 and image G2 at steps S105 to S107 similarly to at the steps S68 to S70. After corresponding point detection succeeds, the image G2 is concatenated to the image G1 at a step S108.

The operation executed at the step S11 in the first embodiment may apply to the foregoing concatenation.

For example, three correspondence detection points E to G (not shown) and the block matching areas are first specified in an image G0, then corresponding points E' to G' (not shown) are picked up from an image Gn in the same manner as at the step S9. Next, position determination performed at the step S11 applies to triangles EFG and E'F'G'. After image concatenation is complete at a step S108, it is determined at a step S109a whether concatenation has terminated. Herein, stereo endoscopic images are employed. When N>2 or three or more optical systems are employed, if n<N is specified, a concatenated image is recognized as a new image G1. Then, the operations of the steps S102 to S109 are repeated.

In images R1 and Rn, or images B1 and Bn, concatenation can be performed on points corresponding to the points correlating the image GI and image Gn.

Alternatively, a series of operations in the flowchart of FIG. 24 may apply to each of R, G, and B images. This will also ensure the aforesaid advantages.

Figure 25:
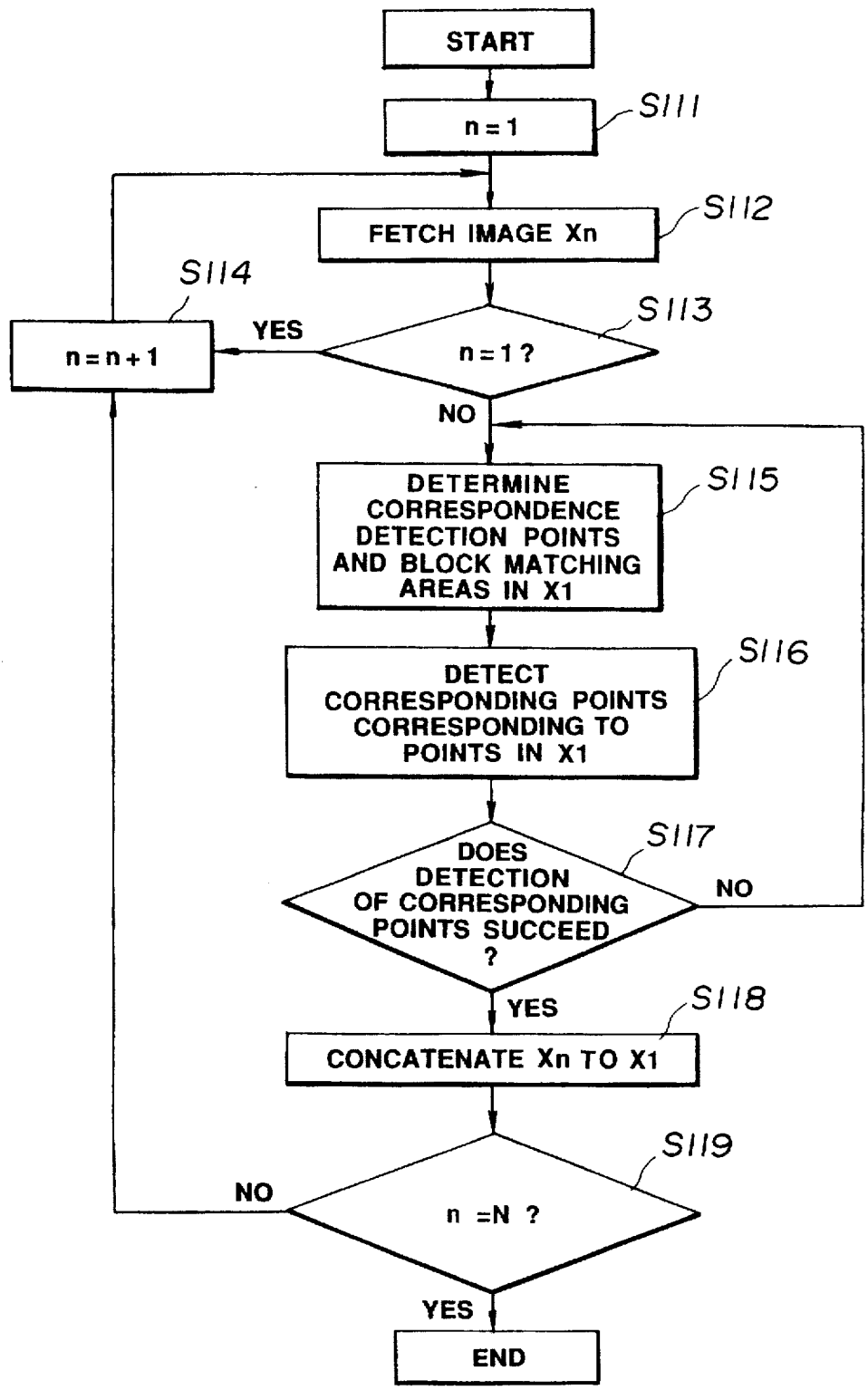

FIG. 25 shows a processing flow for using the color matching procedure detailed as a corresponding point detection procedure for R, G, and B images in Literature 1. The fundamental flow and contents of the processing are identical to those shown in FIG. 24. In this processing, however, block matching can apply directly to color images X1 to Xn. Specifically, the operations of the step S101 to S105 are performed on the image Xn at steps S111 to S115. At a step S116, corresponding points relative to the color image X1 are detected in the color image Xn using the aforesaid color matching procedure. This operation makes it possible to specify corresponding points in R, G, and B images at a time. Next, the operations of steps S117 to S119 corresponding to the steps S107 to S109 are carried out to provide an image having an enlarged field of view.

The third embodiment of the present invention will be described.

The principles of halation removal in this embodiment lie in the fact that the position of a halation area differs among continuous time-series images X0 to Xn (n=1, 2, 3, etc.) a moving endoscope provides. A region lost by halation in an image Xm (0<m</=n) is padded with an associated region of an image Xm-1 in a similar way of creating a mosaic. Thus, data is restored in halation areas sequentially. When m becomes equal to n, an image Xn with the halations removed is provided.

Figure 26:
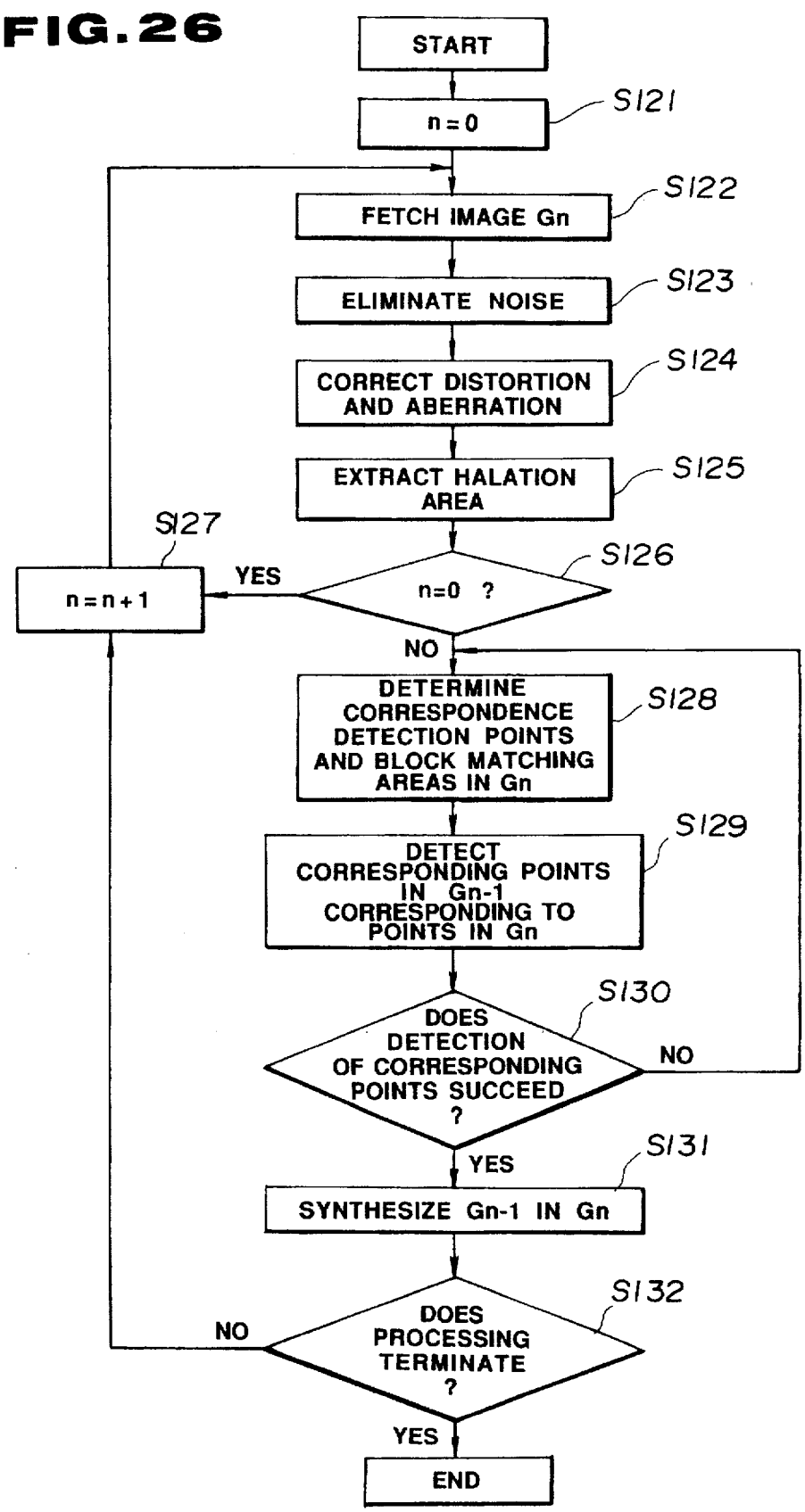

With this processing, images Xk (k=n+1, n+2, n+3, etc.) succeeding the image Xn are provided as images with halations removed. This will be effective in real-time processing for animated images. FIGS. 26 and 27 are flowcharts showing the specific processing flows of this embodiment. The contents of the processing will be described in conjunction with the flowcharts.

FIG. 26 shows a processing flow of halation removal using the aforesaid cross-correlation matching procedure. n=0 is specified at a step S121. Images Gn of images Xn (n=0, 1, 2, 3, etc.) are fetched at a step S122. Noise elimination is performed using a median filter having a 3 by 3 mask at the next step S123.

Next, similarly to the operation described in the first embodiment, distortion and aberration correction is performed on the image Gn at a step S124. Then, the halation area An is extracted at a step S125. It is determined at the next step S126 whether n=0 is specified. If n=0, n is incremented to 1 at a step S127. Then, control returns to the step S122. Then, an image G1 is fetched. If n is equal to or larger than 1, correspondence detection points and block matching areas are specified in the image Gn. Then, corresponding points relative to the image Gn are detected in an image Gn-1 at a step S129. Block matching based on the well-known cross-correlation matching procedure can be employed for the corresponding point detection.

At a step S130 similarly to the step S10 in the first embodiment, it is determined whether corresponding point detection succeeds. If corresponding point detection fails, the operations of the steps S128 and S129 rerun.

After corresponding point detection is executed, image synthesis is performed by padding the image Gn with an image Gn-1 at a step S131. Specifically, the operation executed at the step S11 in the first embodiment is performed on the image Gn and image Gn-1. A point Qn which is identified as a lost point due to halation in the image Gn but as a normal or restored point in the image Gn-1 is selected, then the density of a point Qn in an image Xn-1 is assigned to an point Qn in each of the R, G, and B images of an image Xn.

Then, it is determined at a step S132 whether the processing has terminated. If it has not terminated, control returns to the step S122. Then, the foregoing operations are continued. That is to say, when the foregoing series of operations is kept applying to continuous time-series images until a termination command is received, images with halations eliminated can be provided as animated images in real time. This processing is not limited to the application using a G image as a reference image but may be performed on each of R, G, and B images to remove halations.

FIG. 27 shows a processing flow for using the color matching procedure disclosed as block matching in Literature 1 (U.S. Pat. No. 4,962,540). Herein, color images X0 to Xn are used to detect corresponding points. Steps S141 to 147 correspond to the steps S121 to S127. After correspondence detection points and block matching areas are specified in the image X0 relative to an image Xn at a step S148, corresponding points are detected in the image Xn at a step S149. When the aforesaid color matching procedure is employed for this operation, block matching can be performed directly on the color images X0 to Xn. Steps S150 to 152 correspond to the steps S130 to 132. When these operations apply to continuous time-series images, images with halations removed can be provided as animated images in real time.

Halation removal in this embodiment is not limited to the application to continuous endoscopic images provided in real time, but will also prove effective in the application to images recorded on, for example, magneto-optic disk or video magnetic tape. In this embodiment, continuous images are handled. However, images to be handled may be selected, for example, every other image or at random.

In this embodiment similarly to the first embodiment, halation removal may apply to still images.

Next, the fourth embodiment of the present invention will be described.

Figure 29:
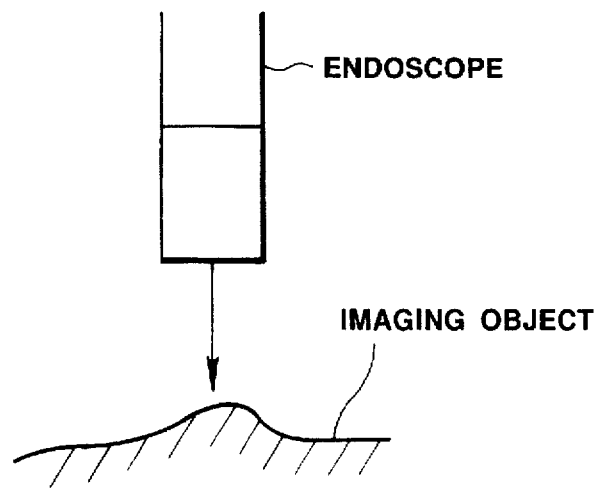

A procedure employed in this embodiment permits images having a field of view and resolution which are unavailable in normal imaging. The principles of the procedure lie in the fact that when an endoscope is moved vertically to an imaging object, as shown in FIG. 29, to provide continuous time-series images X0 to Xn (n=1, 2, 3, etc.), the size of a field of view and the resolution of an image produced varies depending on the distance between the endoscope and the imaging object.

Figure 30B:
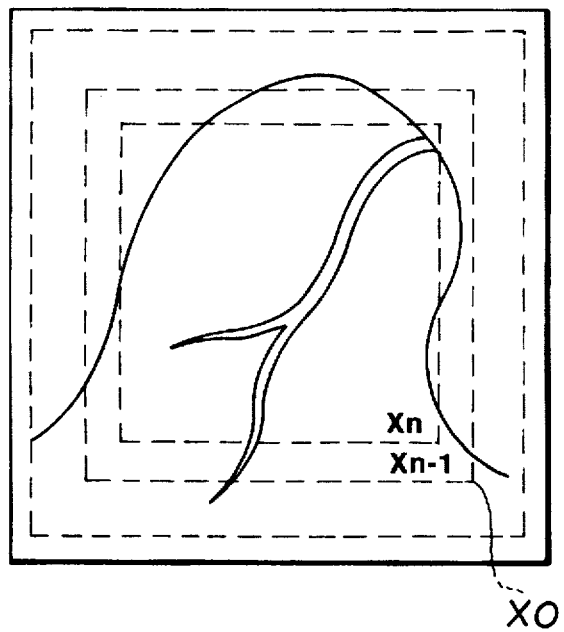
FIGS. 30(a) and 30(b) are explanatory diagrams showing how to provide an image having a wide field of view and high resolution by synthesizing multiple images provided by the processing shown in FIG. 28.
Figure 30A:
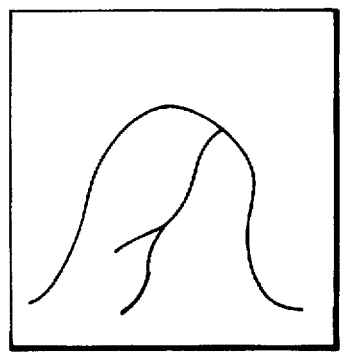

More specifically, when the endoscope and imaging object are distanced widely, the field of view usually becomes wider. However, the produced image provides only limited resolution for an object material. On the other hand, when the distance between the endoscope and imaging object is limited, the field of view is narrowed. However, the produced image provides a higher resolution for the object material. In the processing of this embodiment, when the endoscope is coming from a position specified with n=0 towards an imaging object along with an increment of n, if the processing using block matching conformable to the one specified in the second embodiment applies sequentially to enlarged images Xn-1 relative to an image Xn, a normal image X0 shown in FIG. 30(a) and subsequent images X1, etc. are synthesized to provide a synthetic image shown in FIG. 30(b).

Figure 31:
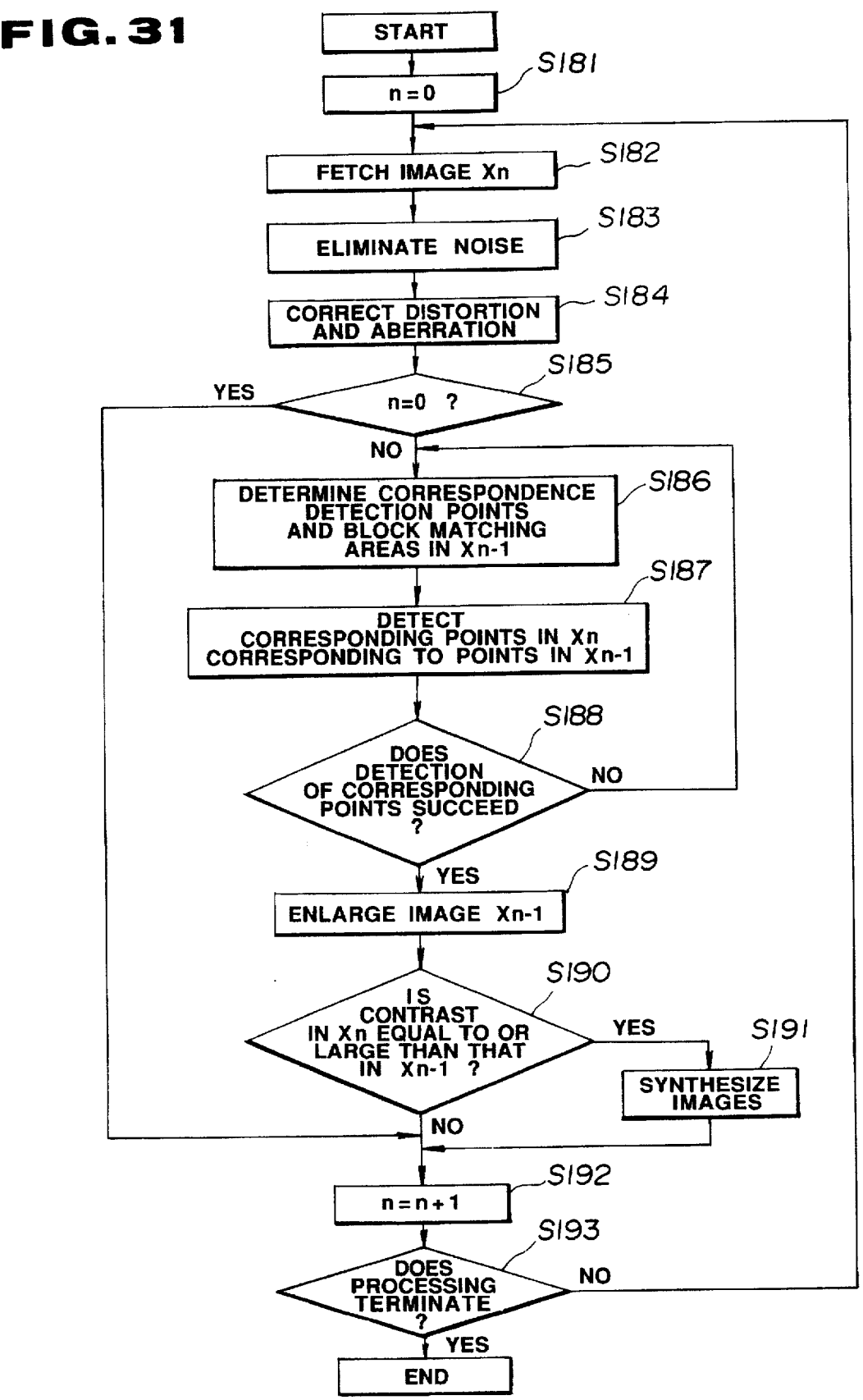

FIGS. 28 and 31 are flowcharts showing the processing flows specified in this embodiments. The contents of the processing will be described in conjunction with the flowcharts.

As shown in FIG. 28, n=0 is specified at a step S161. Then, a G image Gn is fetched at a step S162. Noise elimination and distortion and aberration correction executed at the steps S3 and S4 in the first embodiment are performed on the image Gn at steps S163 and 164. Next, it is determined at a step S165 whether n=0 is specified. If n=0, n is incremented to 1 at a step S172. After determination is made at a step S173, control returns to the step S162. On the other hand, if n>/=1 is specified, the operation executed at the step S8 in the first embodiment is performed at a step S166, so that correspondence detection points and block matching areas will be specified in an image Gn-1. Then, the operation similar to that executed at the step S9 in the first embodiment is performed at a step S167 to detect corresponding points relative to the image Gn-1 in the image Gn.

Figure 33A:
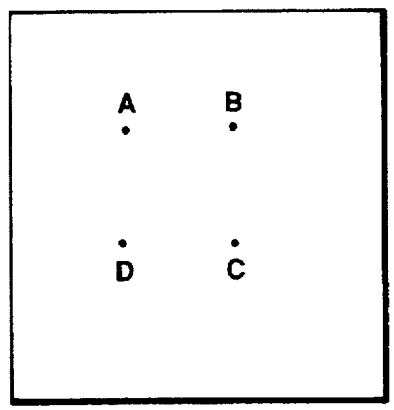
FIGS. 33(a) and 33(b) are explanatory diagrams showing correspondence detection points in the image Gn-1 and correspondent points in the image Gn.
Figure 33B:
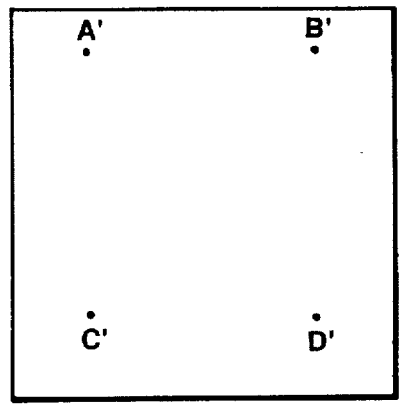

At a step S168, it is determined whether corresponding point detection succeeds. If corresponding point detection fails, control returns to the step S166. If it succeeds, the image Gn-1 is enlarged at the next step S169. As shown in the example of FIG. 32(a), the image Gn, which is acquired very close to an imaging object, visualizes a region larger than the image Gn-1. Herein, the image Gn-1 is enlarged to match the image Gn as shown in FIG. 32(b). Enlargement is performed, for example, as follows:

As shown in FIG. 33(a), assuming that corresponding points A', B', C', and D' in an image Gn relative to points A, B, C, and D in an image Gn-1 are, for example, as shown in FIG. 33(b), when a quadrangle ABCD is enlarged to the size of a quadrangle A'B'C'D', points in the quadrangle A'B'C'D' are provided as described below.

Figure 34A:
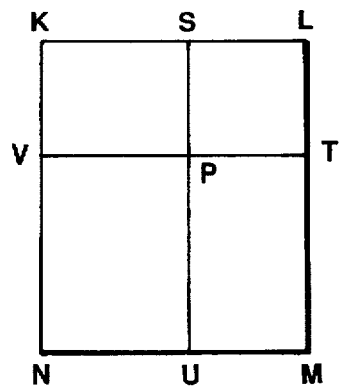
FIGS. 34(a) and 34(b) are explanatory diagrams of position determination for a point P in an area specified with the correspondence detection points in the image Gn-1 and a point P' in an area specified with the correspondence detection points in the image Gn.
Figure 34B:
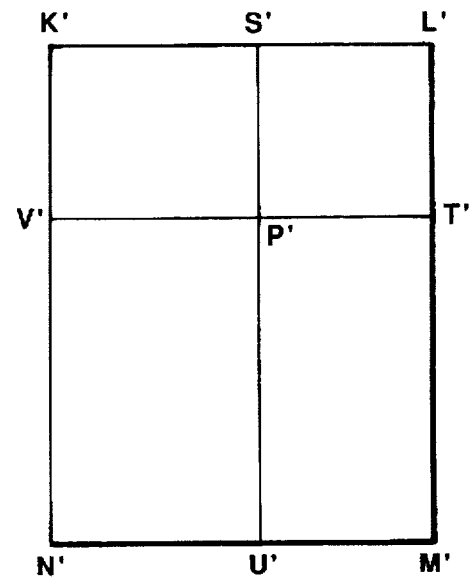

In FIG. 34, the value of a point P' in a quadrangle K'L'M'N' shall be calculated using the value of a point in a quadrangle KLMN. Assuming that the intersections of the straight lines passing through the point P' and being parallel with K'L' and L'M' with respect to K'L' and M'N', and L'M' and N'K' are S' and U', and T' and V', the value of the point P' is derived from the value of an intersection P of a segment SU with a segment TV under the following conditions:

$$K'S':S'L'=KS:SL$$

$$L'T':T'M'=LT:TM$$

$$M'U':U'N'=MU:UN$$

$$N'V':V'K'=NV:VK$$

If a value cannot be derived directly from the corresponding point P, the values of points adjacent to the point P may be used to perform well-known linear interpolation.

The foregoing enlargement is applicable to R and B images as well as G images.

At a step S170, the images Gn-1 and Gn are compared in terms of contrast. If the contrast in the image Gn is higher and the image Gn contains more information than the image Gn-1, the operation similar to that of the step S11 in the first embodiment is executed at a step 171 to perform image synthesis. Specifically, the enlarged image Gn-1 is padded with the image Gn. After the step S171, n is incremented by 1 at a step S172.

The foregoing contrast comparison is achieved by comparing distribution values of images. Alternatively, the well-known two-dimensional discrete Fourier transformation may apply to images to identify an image containing a greater amount of intended high-frequency components which is recognized as a higher-contrast image.

If the contrast comparison of the step S170 determines that Gn>/=Gn-1 is not met, n is incremented by 1 at a step S172. At a step S173, it is determined whether processing has terminated. If the processing has not terminated, an image resulting from the aforesaid operations is used as a new image Gn-1. Then, the similar operations are performed on an image Gn fetched after the image Gn-1. In R and B images, synthesis can be performed on points corresponding to the corresponding points detected in a G image. Alternatively, the operations of the steps S161 to S173 may apply to each of R, G, and B images.

When the aforesaid series of operations is executed repeatedly until a termination command is received, an image having a wide field of view is provided with resolution getting higher towards to the image center.

Termination is determined when the image Gn is acquired at a point closest to an imaging object, wherein the closest point is defined as a point for providing an optimally-focused endoscopic image.

FIG. 31 shows a processing flow for using the color matching procedure disclosed as block matching in Literature 1 (U.S. Pat. No. 4,962,540). Herein, color images X0 to Xn are used to detect corresponding points. Steps S181 to S185 correspond to the steps S161 to 165. At a step S186, correspondence detection points and block matching areas are specified in the image Xn-1 relative to the image Xn. Then, corresponding points are detected at a step S187. When the aforesaid color matching procedure is employed for this operation, block matching can be performed directly on the color images X0 to Xn. Steps S188 to S193 correspond to the steps S168 to S173. The above operations are executed repeatedly until a termination command is received. As a result, an image having the aforesaid advantages is provided.

Figure 35:
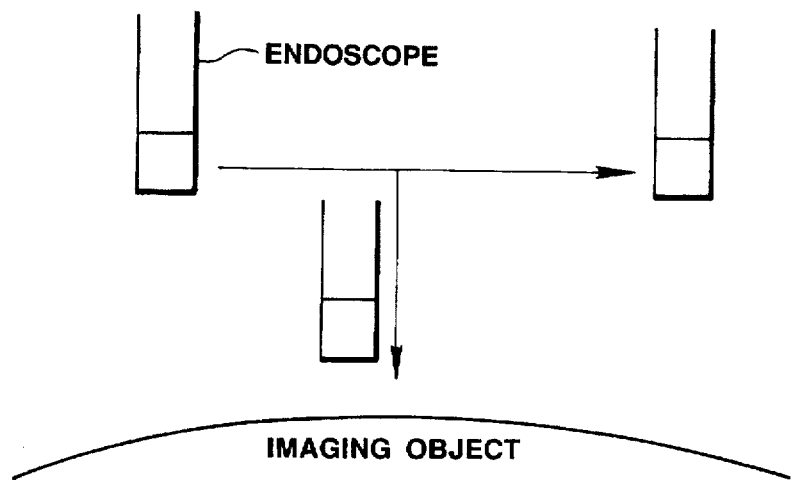
FIG. 35 is an explanatory diagram showing an endoscope to be moved horizontally then vertically.
Figure 36:
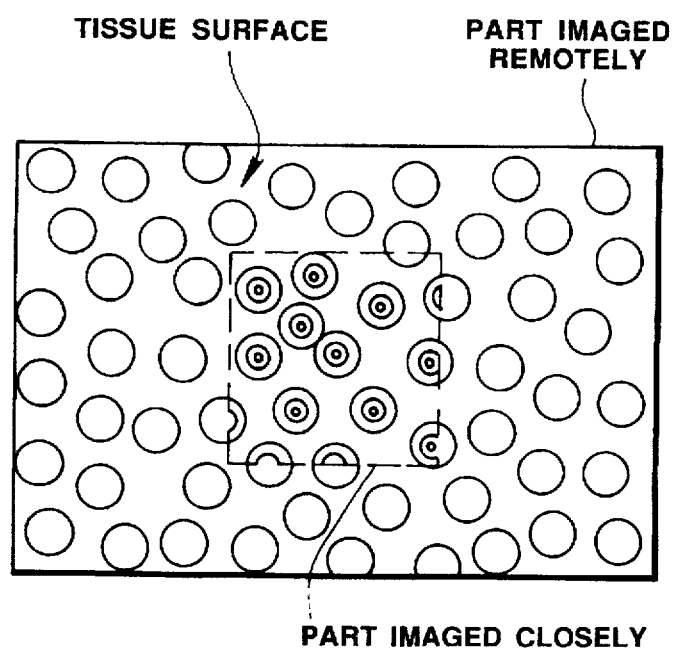
FIG. 36 is an explanatory diagram showing an image provided by applying the first and fourth embodiments to an image provided by the processing shown in FIG. 35.

Assume that an endoscope is, for example, moved horizontally to an imaging object as shown in FIG. 35, placed vertically close to the imaging object at a certain passage point, returned to the position before the approach, then moved horizontally. If a combination of field enlargement in the first embodiment and a series of operations in this embodiment applies to the images acquired as mentioned above, an image shown in FIG. 36 is provided.

The processing of this embodiment may be executed in such a way that after an activation command signal issued from, for example, an information input unit 122 is received, several images are processed to display the resultant image on a monitor 106.

In this embodiment, images acquired by an endoscope approaching an imaging object are handled. There will be no problem if images acquired by an endoscope gradually going away from the closest state are handled. The processing of this embodiment is not restricted to the application to images acquired by an endoscope moving unidirectionally. Furthermore, images to be handled are not confined to those acquired by a moving endoscope, but may be those produced by, for example, optical zooming.

In this embodiment, continuous images are handled. Images to be handled may be selected, for example, every other image or at random.

A series of operations in this embodiment is not restricted to the application to real-time continuous images produced by an endoscope apparatus, but will also prove effective in the application to images recorded on, for example, magneto-optic disk or video magnetic tape.

Images to be handled in the first to fourth embodiments are not limited to G images but may be R or B images. R and B images may be mapped onto a position equivalent to the position determined by mapping G images. Moreover, the processing described previously is not restricted to the application of endoscopic images but may apply to general images; such as, images that are regionally deteriorated on transmission paths.

According to the present invention, it will be apparent that a variety of embodiments can be formed on the basis of the invention without departing from the spirit and scope of the invention. This invention is limited to appended claims but not restricted to any specific embodiments.

What is claimed is:

1. An image processing method comprising:

an image input step for inputting a plurality of two-dimensional endoscopic images acquired from a subject at a plurality of different viewing points;

a corresponding point detecting step for detecting positions of a set of points in one image among said plurality of images with respect to a corresponding set of points in another image among said plurality of images;

an image matching step for matching at least two of said plurality of images by deforming a region in said one image formed by said set of points in said one image detected at said corresponding point detecting step so that its configuration may coincide with that of a region in said another image formed by said corresponding set of points in said another image; and an image synthesizing step for replacing at least one portion of at least said one image matched at said image matching step with image information of a corresponding portion of said another image matched at said image matching step, so as to form a single two-dimensional image.

2. An image processing method according to claim 1 wherein at said image matching step, images are matched with respect to a coordinate state of at least one of at least two images according to the detection result of said corresponding point detecting step.

3. An image processing method according to claim 1 wherein at said image matching step, at least one of enlargement, reduction, and deformation is performed to match images with respect to a coordinate state of at least one of at least two images according to the detection result of said corresponding point detecting step.

4. An image processing method according to claim 1, wherein said corresponding point detecting step includes a fault detecting step for detecting a fault in an image input by said image input step and a fault corresponding point detecting step for detecting corresponding points relative to said plurality of images and an image containing said fault detected by said fault detecting step, and said image synthesizing step synthesizes an image by using at least part of image information of other images and at least an image matched by said image matching step to eliminate said fault.

5. An image processing method according to claim 1 wherein at said image input step, a plurality of time-series images are entered;

at said fault corresponding point detecting step, corresponding points relative to an image containing said fault detected at said fault detecting step are detected in at least a succeeding image;

at said image matching step, an image containing said fault is matched with at least one succeeding image according to an output result of said corresponding point detecting step; and at said image synthesizing step, at least one portion of said image matched at said image matching step is synthesized with at least part of image information of at least a succeeding image to eliminate said fault to form a single image.

6. An image processing method according to claim 1 wherein at said image input step, a plurality of time-series images are entered.

7. An image processing method according to claim 1 wherein at said image synthesizing step, one of at least two images matched at said image matching step is synthesized with at least part of image information of other images to form a single image with a field of view enlarged.

8. An image processing method according to claim 1 wherein said image input step includes a distortion and aberration correcting step for correcting distortion in input images.

9. An image processing method according to claim 1 wherein at said image input step, a plurality of color images are entered.

10. An image processing method according to claim 9 wherein at said corresponding point detecting step, corresponding points are detected in images by performing color matching.

11. An image processing method according to claim 9 wherein at said image input step, said plurality of input color images are divided into R, G and B images; and at said corresponding point detecting step, corresponding points relative to a G image are detected in images.

12. An image processing method according to claim 9 wherein at said image input step, said plurality of input color images are divided into R, G, and B; and at said corresponding point detecting step, corresponding points are detected in images for each of divided R, G, and B images.

13. An image processing method according to claim 1, wherein said image input step inputs said plurality of images from a stereo endoscope.

14. An image processing method according to claim 1, wherein a part of an image acquired with a wider imaging field and at a larger imaging distance from a subject of at least two images matched by said image matching step is synthesized with a part of image information of an image acquired with a narrower imaging field and at a smaller imaging distance from a subject to form a single image.

15. An image processing method comprising:

an image input step for inputting a plurality of two-dimensional color images acquired from a subject at a plurality of different viewing points;

a corresponding point detecting step for detecting positions of a set of points in one image among said plurality of images with respect to a corresponding set of points in another image among said plurality of images;

an image matching step for matching at least two of said plurality of images by deforming a region in said one image formed by said set of points in said one image detected at said corresponding point detecting step so that its configuration may coincide with that of a region in said another image formed by said corresponding set of points in said another image; and an image synthesizing step for replacing at least one portion of at least said one image matched at said image matching step with image information of a corresponding portion of said another image matched at said image matching step so as to form a single two-dimensional image.

16. An image processing method according to claim 15 wherein at said image matching step, images are matched with respect to a coordinate state of at least one of at least two images according to the detection result of said corresponding point detecting step.

17. An image processing method according to claim 15 wherein at said image matching step, at least one of enlargement, reduction, and deformation is performed to match images with respect to a coordinate state of at least one of at least two images according to the detection result of said corresponding point detecting step.

18. An image processing method according to claim 15, wherein said corresponding point detecting step includes a fault detecting step for detecting a fault of an image input by said image input step and a fault corresponding point detecting step for detecting corresponding points of an image containing a fault detected by said fault detecting step relative to said plurality of other images, and said image synthesizing step uses at least part of image information of other images to synthesize an image and at least one image matched by said image matching step to eliminate said fault.

19. An image processing method according to claim 18 wherein at said image input step, a plurality of time-series images are entered;

at said fault corresponding point detecting step, corresponding points relative to an image containing said fault detected at said fault detecting step are detected in at least a succeeding image;

at said image matching step, an image containing said fault is matched with at least one succeeding image according to an output result of said corresponding point detecting step; and at said image synthesizing step, at least one portion of said image matched at said image matching step is synthesized with at least part of image information of at least a succeeding image to eliminate said fault to form a single image.

20. An image processing method according to claim 15 wherein at said image input step, a plurality of time-series images are entered.

21. An image processing method according to claim 15 wherein at said image synthesizing step, one of at least two images matched at said image matching step is synthesized with at least part of image information of other images to form a single image with a field of view enlarged.

22. An image processing method according to claim 15 wherein said image input step includes a distortion and aberration correcting step for correcting distortion in input images.

23. An image processing method according to claim 15 wherein at said corresponding point detecting step, corresponding points are detected in images by performing color matching.

24. An image processing method according to claim 15 wherein at said image input step, said plurality of input color images are divided into R, G, and B images; and at said corresponding point detecting step, corresponding points relative to a G image are detected in images.

25. An image processing method according to claim 15 wherein at said image input step, said plurality of input color images are divided into R, G, and B images; and at said corresponding point detecting step, corresponding points are detected in images for each of divided R, G, and B images.

26. An image processing method according to claim 15, wherein a part of an image acquired with a wider imaging field and at a larger imaging distance from a subject of at least two images matched by said image matching step is synthesized with a part of image information of an image acquired with a narrower image field and at a smaller imaging distance from a subject to form a single image.

27. An image processing method comprising:

an image input step for inputting a plurality of images acquired from a subject at a plurality of different viewing points, and having a different imaging distance from a subject;

a corresponding point detecting step for detecting positions of a set of points in one image among said plurality of images with respect to a corresponding set of points in another image among said plurality of images;

an image matching step for matching at least two of said plurality of images by deforming a region in said one image formed by said set of points in said one image detected at said corresponding point detecting step so that its configuration may coincide with that of a region in said another image formed by said corresponding set of points in said another image; and an image synthesizing step for replacing part of an image acquired with a wider imaging field and at a larger imaging distance from the subject of at least said two images matched at said image matching step, with image information of a corresponding portion of said another image matched at said image matching step and acquired with a narrower imaging field and at a smaller imaging distance from the subject so as to form a single two-dimensional image.

28. An image processing method comprising:

an image input step for inputting a plurality of two-dimensional images acquired by a stereo endoscope from a subject at a plurality of different viewing points;

a corresponding point detecting step for detecting positions of a set of points in one image among said plurality of images with respect to a corresponding set of points in another image among said plurality of images;

an image matching step for matching at least two of said plurality of images by deforming a region in said one image formed by said set of points in said one image detected at said corresponding point detecting step so that its configuration may coincide with that of a region in said another image formed by said corresponding set of points in said another image; and an image synthesizing step for matching at least one portion of at least said one image matched at said image matching step with image information of a corresponding portion of said another image matched at said image matching step, so as to form a single two-dimensional image.

29. An image processing method comprising:

an image input step for inputting a plurality of time-series endoscopic images in two dimensions acquired from a subject at a plurality of different viewing points;

an input image storage step for storing at least one of said plurality of time-series endoscopic images entered in said image input step;

a fault detecting step for detecting a fault in an image entered at said image input step;

a fault corresponding point detecting step for detecting positions of sets of points relative to one image containing said fault detected in said image at said fault detecting step with a corresponding set of points in a stored image;

an image matching step for matching said one image containing said fault with said stored image at a preceding step by deforming a region in said one image formed by said set of points in said one image detected at said fault corresponding point detecting step so that its configuration may coincide with that of a region in said stored image formed by said corresponding set of points in said stored image; and an image synthesizing step for eliminating said fault of at least one portion of at least said one image matched at said image matching step with image information of said stored image from a preceding step to form a single two-dimensional image.

30. An image processing method comprising:

an image input step for inputting a plurality of time-series color images in two dimensions acquired from a subject at a plurality of different viewing points;

an input image storage step for storing at least one of said plurality of time-series color images entered in said image input step;

a fault detecting step for detecting a fault in an image entered at said image input step;

a fault corresponding point detecting step for detecting positions of sets of points relative to one image containing said fault detected in said image at said fault detecting step with a corresponding set of points in a stored image;

an image matching step for matching an image containing said fault with said image at a preceding step by deforming a region in said one image formed by said set of points in said one image detected at said fault corresponding point detecting step so that its configuration may coincide with that of a region in said stored image formed by said corresponding set of points in said stored image; and an image synthesizing step for eliminating said fault of at least one portion of at least one image matched at said image matching step with image information of said stored image from a preceding step to form a single two-dimensional image.

31. An image processing apparatus comprising:

an image input means for inputting a plurality of two-dimensional endoscopic images acquired from a subject at a plurality of different viewing points;

a corresponding point detecting means for detecting positions of a set of points in one image among said plurality of images with respect to a corresponding set of points in another image among said plurality of images;

an image matching means for matching at least two of said plurality of images by deforming a region in said one image formed by said set of points in said one image detected by said corresponding point detecting means so that its configuration may coincide with that of a region in said another image formed by said corresponding set of points in said another image; and an image synthesizing means for replacing at least one portion of said image matched by said image matching means with image information of a corresponding portion of said another image matched by said image matching means, so as to form a single two-dimensional image.

32. An image processing apparatus comprising:

an image input means for inputting a plurality of two-dimensional color images acquired from a subject at a plurality of different viewing points;

a corresponding point detecting means for detecting positions of a set of points in one image among said plurality of images with respect to a corresponding set of points in another image among said plurality of images;

an image matching means for matching at least two of said plurality of images by deforming a region in said one image formed by said set of points in said one image detected by said corresponding point detecting means so that its configuration may coincide with that of a region in said another image formed by said corresponding set of points in said another image; and an image synthesizing means for replacing at least one portion of said image matched by said image matching means with image information of a corresponding portion of said another image matched by said image matching means, so as to form a single two-dimensional image.

33. An image processing apparatus comprising:

an image input means for inputting a plurality of time-series endoscopic images in two-dimensions acquired from a subject at a plurality of different viewing points;

an input image storage means for storing at least one image of said plurality of time-series endoscopic images entered by said image input means;

a fault detecting step for detecting a fault in an image entered at said image input step;

a fault corresponding point detecting means for detecting positions of sets of points relative to one image containing said fault detected by said fault detecting means with a corresponding set of points in at least another image stored in said storage means;

an image matching means for matching an image containing said fault with at least said image stored in said storage means by deforming a region in said one image formed by said set of points in said one image detected by said fault corresponding point detecting means so that its configuration may coincide with that of a region in said another image formed by said corresponding set of points in said another image; and an image synthesizing means for eliminating said fault of at least one portion of said one image matched by said image matching means with image information of at least a portion of said another image stored in said storage means to form a single two-dimensional image.

34. An image processing apparatus comprising:

an image input means for inputting a plurality of time-series color images in two dimensions acquired from a subject at a plurality of different viewing points;

an input image storage means for storing at least one image of said plurality of time-series color images entered by said image input means;

a fault detecting means for detecting a fault in an image entered by said image input means;

a fault corresponding point detecting means for detecting positions of sets of points relative to one image containing said fault detected by said fault detecting means in a corresponding set of points in at least another image stored in said storage means;

an image matching means for matching an image containing said fault with at least said image stored in said storage means by deforming a region in said one image formed by said set of points in said one image detected by said corresponding point detecting means so that its configuration may coincide with that of a region in said another image formed by said corresponding set of points in said another image; and an image synthesizing means for eliminating at least said fault of at least one portion of said one image matched by said image matching means with image information of at least said another image stored in said storage means to form a single two-dimensional image.

* * * * *